US012775599B1

(12) United States Patent
Patil et al.

(10) Patent No.: US 12,775,599 B1
(45) Date of Patent: Oct. 27, 2026

(54) SYSTEMS AND METHODS TO IMPLEMENT AN INFORMATION DELETION POLICY FOR INFORMATION MAINTAINING A COLLABORATION ENVIRONMENT

(71) Applicant: Asana, Inc., San Francisco, CA (US)

(72) Inventors: Shreyas Ravindra Patil, San Francisco, CA (US); Shoaib Akbar, San Francisco, CA (US); Shuojie Li, Plano, TX (US)

(73) Assignee: Asana, Inc., San Francisco, CA (US)

( * ) Notice: Subject to any disclaimer, the term of this patent is extended or adjusted under 35 U.S.C. 154(b) by 946 days.

(21) Appl. No.: 17/953,116

(22) Filed: Sep. 26, 2022

(51) Int. Cl.
*G06F 16/93* (2019.01)
*G06F 16/215* (2019.01)
*G06F 16/28* (2019.01)
*G06Q 10/10* (2023.01)

(52) U.S. Cl.
CPC .......... *G06F 16/215* (2019.01); *G06F 16/285* (2019.01); *G06Q 10/103* (2013.01)

(58) Field of Classification Search
CPC ... G06F 16/215; G06F 16/285; G06Q 10/103; G06Q 10/10; G06Q 50/18; G06N 20/00
See application file for complete search history.

(56) References Cited

U.S. PATENT DOCUMENTS 5,233,687 A 8/1993 Henderson, Jr.
5,524,077 A 6/1996 Faaland
5,530,861 A 6/1996 Diamant
5,608,898 A 3/1997 Turpin
5,611,076 A 3/1997 Durflinger
5,623,404 A 4/1997 Collins
5,721,770 A 2/1998 Kohler
5,983,277 A 11/1999 Heile
5,987,453 A 11/1999 Krishna
6,024,093 A 2/2000 Cron
6,167,399 A 12/2000 Hoang
(Continued)

FOREIGN PATENT DOCUMENTS

CN 101305350 A 11/2008
CN 101563671 A 10/2009
(Continued)

OTHER PUBLICATIONS

Creating Tables with Fields from 2 Different Tables, published: 2009, publisher: StackOverflow, pp. 1-2. (Year: 2009).
(Continued)

*Primary Examiner* — Charles Rones
(74) *Attorney, Agent, or Firm* — Esplin & Associates, PC

(57) ABSTRACT

Systems and methods to implement an information deletion policy for information maintaining a collaboration environment are described herein. The deletion policy may dictate a cascading process of deletion of environment objects of the collaboration environment based on relationship types with target environment objects to be deleted. By way of non-limiting illustration, the cascading process may dictate deletion of individual environment objects having a deletion type relationship with an individual target environment object, and nullification of information included in the individual ones of the environment objects having a nullification type relationship with an individual target environment object.

20 Claims, 4 Drawing Sheets

(56) References Cited

U.S. PATENT DOCUMENTS

| | | | | |
|---|---|---|---|---|
| 6,256,651 | B1 | 7/2001 | Tuli | |
| 6,292,830 | B1 | 9/2001 | Taylor | |
| 6,332,147 | B1 | 12/2001 | Moran | |
| 6,385,639 | B1 | 5/2002 | Togawa | |
| 6,442,748 | B1 * | 8/2002 | Bowman-Amuah | G06F 9/4493 707/999.009 |
| 6,621,505 | B1 | 9/2003 | Beauchamp | |
| 6,629,081 | B1 | 9/2003 | Cornelius | |
| 6,769,013 | B2 | 7/2004 | Frees | |
| 6,859,523 | B1 | 2/2005 | Jilk | |
| 7,020,697 | B1 | 3/2006 | Goodman | |
| 7,039,596 | B1 | 5/2006 | Lu | |
| 7,086,062 | B1 | 8/2006 | Faour | |
| 7,143,108 | B1 * | 11/2006 | George | G06F 16/284 |
| 7,349,920 | B1 | 3/2008 | Feinberg | |
| 7,386,797 | B1 | 6/2008 | Chatterjee | |
| 7,418,482 | B1 | 8/2008 | Lusher | |
| 7,428,723 | B2 | 9/2008 | Greene | |
| 7,640,511 | B1 | 12/2009 | Keel | |
| 7,676,542 | B2 | 3/2010 | Moser | |
| 7,779,039 | B2 | 8/2010 | Weissman | |
| 7,801,886 | B1 | 9/2010 | Gabriel | |
| 7,805,327 | B1 | 9/2010 | Schulz | |
| RE41,848 | E | 10/2010 | Daniell | |
| 7,917,855 | B1 | 3/2011 | Satish | |
| 7,996,744 | B2 | 8/2011 | Ojala | |
| 7,996,774 | B1 | 8/2011 | Sidenur | |
| 8,214,747 | B1 | 7/2012 | Yankovich | |
| 8,314,809 | B1 | 11/2012 | Grabowski | |
| 8,327,419 | B1 | 12/2012 | Korablev | |
| 8,499,300 | B2 | 7/2013 | Zimberg | |
| 8,522,240 | B1 | 8/2013 | Merwarth | |
| 8,527,287 | B1 | 9/2013 | Bhatia | |
| 8,554,832 | B1 | 10/2013 | Moskovitz | |
| 8,572,477 | B1 | 10/2013 | Moskovitz | |
| 8,627,199 | B1 | 1/2014 | Handley | |
| 8,639,552 | B1 | 1/2014 | Chen | |
| 8,700,537 | B1 | 4/2014 | Deshpande | |
| 8,768,751 | B2 | 7/2014 | Jakowski | |
| 8,831,879 | B2 | 9/2014 | Stamm | |
| 8,843,832 | B2 | 9/2014 | Frields | |
| 8,863,021 | B1 | 10/2014 | Bee | |
| 9,009,096 | B2 | 4/2015 | Pinckney | |
| 9,024,752 | B2 | 5/2015 | Tumayan | |
| 9,143,839 | B2 | 9/2015 | Reisman | |
| 9,152,668 | B1 | 10/2015 | Moskovitz | |
| 9,201,952 | B1 | 12/2015 | Chau | |
| 9,208,262 | B2 | 12/2015 | Bechtel | |
| 9,251,484 | B2 | 2/2016 | Cantor | |
| 9,350,560 | B2 | 5/2016 | Hupfer | |
| 9,383,917 | B2 | 7/2016 | Mouton | |
| 9,405,532 | B1 | 8/2016 | Sullivan | |
| 9,405,810 | B2 | 8/2016 | Smith | |
| 9,454,623 | B1 | 9/2016 | Kaptsan | |
| 9,514,424 | B2 | 12/2016 | Kleinbart | |
| 9,600,136 | B1 | 3/2017 | Yang | |
| 9,674,361 | B2 | 6/2017 | Ristock | |
| 9,712,576 | B1 | 7/2017 | Gill | |
| 9,785,445 | B2 | 10/2017 | Mitsui | |
| 9,830,398 | B2 | 11/2017 | Schneider | |
| 9,842,312 | B1 | 12/2017 | Rosati | |
| 9,949,681 | B2 | 4/2018 | Badenes | |
| 9,953,282 | B2 | 4/2018 | Shaouy | |
| 9,959,420 | B2 | 5/2018 | Kiang | |
| 9,978,040 | B2 | 5/2018 | Lee | |
| 9,990,636 | B1 | 6/2018 | Lewis | |
| 10,001,911 | B2 | 6/2018 | Breedvelt-Schouten | |
| 10,003,693 | B2 | 6/2018 | Wolthuis | |
| 10,083,412 | B2 | 9/2018 | Suntinger | |
| 10,157,355 | B2 | 12/2018 | Johnson | |
| 10,192,181 | B2 | 1/2019 | Katkar | |
| 10,235,156 | B2 | 3/2019 | Johnson | |
| 10,264,067 | B2 | 4/2019 | Subramani | |
| 10,308,992 | B2 | 6/2019 | Chauvin | |
| 10,373,084 | B2 | 8/2019 | Kurjanowicz | |
| 10,373,090 | B2 | 8/2019 | Holm | |
| 10,382,501 | B2 | 8/2019 | Malatesha | |
| 10,455,011 | B2 | 10/2019 | Kendall | |
| 10,496,943 | B2 | 12/2019 | De | |
| 10,552,391 | B2 * | 2/2020 | Paulk | G06Q 10/06 |
| 10,585,654 | B2 * | 3/2020 | Singh | G06F 8/60 |
| 10,594,788 | B2 | 3/2020 | Larabie-Belanger | |
| 10,606,859 | B2 | 3/2020 | Smith | |
| 10,606,901 | B1 * | 3/2020 | Nair | G06F 16/122 |
| 10,613,735 | B1 | 4/2020 | Karpe | |
| 10,616,151 | B1 | 4/2020 | Cameron | |
| 10,623,359 | B1 | 4/2020 | Rosenstein | |
| 10,671,692 | B2 | 6/2020 | Koopman | |
| 10,684,870 | B1 | 6/2020 | Sabo | |
| 10,706,484 | B1 | 7/2020 | Murnock | |
| 10,785,046 | B1 | 9/2020 | Raghavan | |
| 10,810,222 | B2 | 10/2020 | Koch | |
| 10,846,105 | B2 | 11/2020 | Granot | |
| 10,846,297 | B2 | 11/2020 | Smith | |
| 10,922,104 | B2 | 2/2021 | Sabo | |
| 10,956,845 | B1 | 3/2021 | Sabo | |
| 10,970,299 | B2 | 4/2021 | Smith | |
| 10,977,434 | B2 | 4/2021 | Pelz | |
| 10,983,685 | B2 | 4/2021 | Karpe | |
| 11,082,281 | B2 | 8/2021 | Rosenstein | |
| 11,095,468 | B1 | 8/2021 | Pandey | |
| 11,108,828 | B1 | 8/2021 | Curtis | |
| 11,113,667 | B1 | 9/2021 | Jiang | |
| 11,138,021 | B1 | 10/2021 | Rosenstein | |
| 11,140,174 | B2 | 10/2021 | Patel | |
| 11,204,683 | B1 | 12/2021 | Sabo | |
| 11,212,242 | B2 | 12/2021 | Cameron | |
| 11,263,228 | B2 | 3/2022 | Koch | |
| 11,288,081 | B2 | 3/2022 | Sabo | |
| 11,290,296 | B2 | 3/2022 | Raghavan | |
| 11,327,645 | B2 | 5/2022 | Karpe | |
| 11,341,444 | B2 | 5/2022 | Sabo | |
| 11,341,445 | B1 | 5/2022 | Cheng | |
| 11,599,855 | B1 * | 3/2023 | Pelz | G06Q 10/101 |
| 2002/0065798 | A1 | 5/2002 | Bostleman | |
| 2002/0082889 | A1 | 6/2002 | Oliver | |
| 2002/0143594 | A1 | 10/2002 | Kroeger | |
| 2003/0028595 | A1 | 2/2003 | Vogt | |
| 2003/0028616 | A1 | 2/2003 | Aoki | |
| 2003/0036934 | A1 | 2/2003 | Ouchi | |
| 2003/0041317 | A1 | 2/2003 | Sokolov | |
| 2003/0046576 | A1 | 3/2003 | Howard | |
| 2003/0097406 | A1 | 5/2003 | Stafford | |
| 2003/0097410 | A1 | 5/2003 | Atkins | |
| 2003/0126001 | A1 | 7/2003 | Northcutt | |
| 2003/0156138 | A1 | 8/2003 | Vronay | |
| 2003/0200223 | A1 | 10/2003 | Hack | |
| 2003/0220975 | A1 | 11/2003 | Malik | |
| 2003/0225598 | A1 | 12/2003 | Yu | |
| 2003/0233265 | A1 | 12/2003 | Lee | |
| 2003/0233268 | A1 | 12/2003 | Taqbeem | |
| 2003/0236979 | A1 | 12/2003 | Himmel | |
| 2004/0083448 | A1 | 4/2004 | Schulz | |
| 2004/0093290 | A1 | 5/2004 | Doss | |
| 2004/0093351 | A1 | 5/2004 | Lee | |
| 2004/0098291 | A1 | 5/2004 | Newburn | |
| 2004/0125150 | A1 | 7/2004 | Adcock | |
| 2004/0162833 | A1 | 8/2004 | Jones | |
| 2004/0187089 | A1 | 9/2004 | Schulz | |
| 2004/0207249 | A1 | 10/2004 | Baumgartner | |
| 2004/0230447 | A1 | 11/2004 | Schwerin-Wenzel | |
| 2004/0261013 | A1 | 12/2004 | Wynn | |
| 2004/0268451 | A1 | 12/2004 | Robbin | |
| 2005/0144022 | A1 * | 6/2005 | Evans | G06Q 10/0639 707/999.1 |
| 2005/0210394 | A1 | 9/2005 | Crandall | |
| 2005/0216111 | A1 | 9/2005 | Ooshima | |
| 2005/0222971 | A1 | 10/2005 | Cary | |
| 2006/0028917 | A1 | 2/2006 | Wigginton | |
| 2006/0047454 | A1 | 3/2006 | Tamaki | |
| 2006/0048151 | A1 | 3/2006 | Haruta | |
| 2006/0085245 | A1 | 4/2006 | Takatsuka | |
| 2006/0095859 | A1 | 5/2006 | Bocking | |

(56) References Cited

U.S. PATENT DOCUMENTS

| | | | | |
|---|---|---|---|---|
| 2006/0136441 | A1 | 6/2006 | Fujisaki | |
| 2006/0143270 | A1 | 6/2006 | Wodtke | |
| 2006/0167736 | A1 | 7/2006 | Weiss | |
| 2006/0190391 | A1 | 8/2006 | Cullen, III | |
| 2006/0200264 | A1 | 9/2006 | Kodama | |
| 2006/0218551 | A1 | 9/2006 | Berstis | |
| 2006/0224430 | A1 | 10/2006 | Butt | |
| 2006/0235985 | A1 | 10/2006 | Ramkumar | |
| 2006/0277487 | A1 | 12/2006 | Poulsen | |
| 2007/0016646 | A1 | 1/2007 | Tendjoukian | |
| 2007/0025567 | A1 | 2/2007 | Fehr | |
| 2007/0038494 | A1 | 2/2007 | Kreitzberg | |
| 2007/0041542 | A1 | 2/2007 | Schramm | |
| 2007/0050225 | A1 | 3/2007 | Leslie | |
| 2007/0073575 | A1 | 3/2007 | Yomogida | |
| 2007/0143169 | A1 | 6/2007 | Grant | |
| 2007/0147178 | A1 | 6/2007 | Masuda | |
| 2007/0150327 | A1 | 6/2007 | Dromgold | |
| 2007/0232278 | A1 | 10/2007 | May | |
| 2007/0255674 | A1 | 11/2007 | Mahoney | |
| 2007/0255715 | A1 | 11/2007 | Li | |
| 2007/0260499 | A1 | 11/2007 | Greef | |
| 2007/0288283 | A1 | 12/2007 | Fitzpatrick | |
| 2007/0294344 | A1 | 12/2007 | Mohan | |
| 2008/0033777 | A1 | 2/2008 | Shukoor | |
| 2008/0046471 | A1 | 2/2008 | Moore | |
| 2008/0079730 | A1 | 4/2008 | Zhang | |
| 2008/0082389 | A1 | 4/2008 | Gura | |
| 2008/0082956 | A1 | 4/2008 | Gura | |
| 2008/0091782 | A1 | 4/2008 | Jakobson | |
| 2008/0120129 | A1 | 5/2008 | Seubert | |
| 2008/0126930 | A1 | 5/2008 | Scott | |
| 2008/0133524 | A1 | 6/2008 | Ryan | |
| 2008/0134069 | A1 | 6/2008 | Horvitz | |
| 2008/0155547 | A1 | 6/2008 | Weber | |
| 2008/0158023 | A1 | 7/2008 | Chung | |
| 2008/0167937 | A1 | 7/2008 | Coughlin | |
| 2008/0175104 | A1 | 7/2008 | Grieb | |
| 2008/0195964 | A1 | 8/2008 | Randell | |
| 2008/0221946 | A1 | 9/2008 | Balon | |
| 2008/0222566 | A1 | 9/2008 | Daughtrey | |
| 2008/0244582 | A1 | 10/2008 | Brown | |
| 2008/0268876 | A1 | 10/2008 | Gelfand | |
| 2008/0270198 | A1 | 10/2008 | Graves | |
| 2008/0281665 | A1 | 11/2008 | Opaluch | |
| 2008/0282326 | A1 | 11/2008 | Miller | |
| 2008/0313004 | A1 | 12/2008 | Ryan | |
| 2008/0313730 | A1 | 12/2008 | Iftimie | |
| 2009/0048986 | A1 | 2/2009 | Anderson | |
| 2009/0055796 | A1 | 2/2009 | Springborn | |
| 2009/0076878 | A1 | 3/2009 | Woerner | |
| 2009/0089133 | A1 | 4/2009 | Johnson | |
| 2009/0094623 | A1 | 4/2009 | Chakra | |
| 2009/0113310 | A1 | 4/2009 | Appleyard | |
| 2009/0133027 | A1 | 5/2009 | Gunning | |
| 2009/0167553 | A1 | 7/2009 | Hong | |
| 2009/0187454 | A1 | 7/2009 | Khasin | |
| 2009/0199192 | A1 | 8/2009 | Laithwaite | |
| 2009/0204463 | A1 | 8/2009 | Burnett | |
| 2009/0204471 | A1 | 8/2009 | Elenbaas | |
| 2009/0234699 | A1 | 9/2009 | Steinglass | |
| 2009/0241053 | A1 | 9/2009 | Augustine | |
| 2009/0260010 | A1 | 10/2009 | Burkhart | |
| 2009/0287523 | A1 | 11/2009 | Lau | |
| 2009/0296908 | A1 | 12/2009 | Lee | |
| 2009/0299803 | A1 | 12/2009 | Lakritz | |
| 2009/0307319 | A1 | 12/2009 | Dholakia | |
| 2010/0005087 | A1 | 1/2010 | Basco | |
| 2010/0070888 | A1 | 3/2010 | Watabe | |
| 2010/0081417 | A1 | 4/2010 | Hickie | |
| 2010/0088137 | A1 | 4/2010 | Weiss | |
| 2010/0106627 | A1 | 4/2010 | O'Sullivan | |
| 2010/0114786 | A1 | 5/2010 | Aboujaoude | |
| 2010/0115523 | A1 | 5/2010 | Kuschel | |
| 2010/0122334 | A1 | 5/2010 | Stanzione | |
| 2010/0131860 | A1 | 5/2010 | Dehaan | |
| 2010/0145801 | A1 | 6/2010 | Chekuri | |
| 2010/0169146 | A1 | 7/2010 | Hoyne | |
| 2010/0169802 | A1 | 7/2010 | Goldstein | |
| 2010/0180212 | A1 | 7/2010 | Gingras | |
| 2010/0223575 | A1 | 9/2010 | Leukart | |
| 2010/0241971 | A1 * | 9/2010 | Zuber | G06F 16/93 709/204 |
| 2010/0269049 | A1 | 10/2010 | Fearon | |
| 2010/0299171 | A1 | 11/2010 | Lau | |
| 2010/0312605 | A1 | 12/2010 | Mitchell | |
| 2010/0313151 | A1 | 12/2010 | Wei | |
| 2011/0015961 | A1 | 1/2011 | Chan | |
| 2011/0022662 | A1 | 1/2011 | Barber-Mingo | |
| 2011/0054968 | A1 | 3/2011 | Galaviz | |
| 2011/0055177 | A1 | 3/2011 | Chakra | |
| 2011/0060720 | A1 | 3/2011 | Devereux | |
| 2011/0071878 | A1 | 3/2011 | Gingras | |
| 2011/0071893 | A1 | 3/2011 | Malhotra | |
| 2011/0072372 | A1 | 3/2011 | Fritzley | |
| 2011/0093538 | A1 | 4/2011 | Weir | |
| 2011/0093619 | A1 | 4/2011 | Nelson | |
| 2011/0113365 | A1 | 5/2011 | Kimmerly | |
| 2011/0154216 | A1 | 6/2011 | Aritsuka | |
| 2011/0161128 | A1 | 6/2011 | Barney | |
| 2011/0184768 | A1 | 7/2011 | Norton | |
| 2011/0238706 | A1 * | 9/2011 | Wong | G06F 16/284 707/E17.055 |
| 2011/0270644 | A1 | 11/2011 | Roncolato | |
| 2011/0302521 | A1 | 12/2011 | Jiang | |
| 2011/0307100 | A1 | 12/2011 | Schmidtke | |
| 2011/0307772 | A1 | 12/2011 | Lloyd | |
| 2012/0030194 | A1 | 2/2012 | Jain | |
| 2012/0035942 | A1 | 2/2012 | Graupner | |
| 2012/0066030 | A1 | 3/2012 | Limpert | |
| 2012/0066411 | A1 | 3/2012 | Jeide | |
| 2012/0072251 | A1 | 3/2012 | Mircean | |
| 2012/0079449 | A1 | 3/2012 | Sanderson | |
| 2012/0110087 | A1 | 5/2012 | Culver | |
| 2012/0117499 | A1 | 5/2012 | Mori | |
| 2012/0123835 | A1 | 5/2012 | Chu | |
| 2012/0131191 | A1 | 5/2012 | May | |
| 2012/0158757 | A1 | 6/2012 | Bhattacharjee | |
| 2012/0158946 | A1 | 6/2012 | Shafiee | |
| 2012/0192086 | A1 | 7/2012 | Ghods | |
| 2012/0221963 | A1 | 8/2012 | Motoyama | |
| 2012/0239451 | A1 | 9/2012 | Caligor | |
| 2012/0254218 | A1 | 10/2012 | Ali | |
| 2012/0266068 | A1 | 10/2012 | Ryman | |
| 2012/0278388 | A1 | 11/2012 | Kleinbart | |
| 2012/0296993 | A1 | 11/2012 | Heyman | |
| 2012/0304187 | A1 | 11/2012 | Maresh | |
| 2012/0317108 | A1 | 12/2012 | Okazaki | |
| 2013/0007332 | A1 | 1/2013 | Teh | |
| 2013/0013560 | A1 | 1/2013 | Goldberg | |
| 2013/0014023 | A1 | 1/2013 | Lee | |
| 2013/0018688 | A1 | 1/2013 | Nudd | |
| 2013/0021629 | A1 | 1/2013 | Kurilin | |
| 2013/0066944 | A1 | 3/2013 | Laredo | |
| 2013/0067375 | A1 | 3/2013 | Kim | |
| 2013/0067549 | A1 | 3/2013 | Caldwell | |
| 2013/0073328 | A1 | 3/2013 | Ehrler | |
| 2013/0103412 | A1 | 4/2013 | Nudd | |
| 2013/0124638 | A1 | 5/2013 | Barreto | |
| 2013/0151421 | A1 | 6/2013 | Van Der Ploeg | |
| 2013/0151604 | A1 | 6/2013 | Ranade | |
| 2013/0173486 | A1 | 7/2013 | Peters | |
| 2013/0179208 | A1 | 7/2013 | Chung | |
| 2013/0179799 | A1 | 7/2013 | Savage | |
| 2013/0215116 | A1 | 8/2013 | Siddique | |
| 2013/0227007 | A1 | 8/2013 | Savage | |
| 2013/0246110 | A1 | 9/2013 | Nakhayi Ashtiani | |
| 2013/0246399 | A1 | 9/2013 | Schneider | |
| 2013/0275229 | A1 | 10/2013 | Moganti | |
| 2013/0279685 | A1 | 10/2013 | Kohler | |
| 2013/0317871 | A1 | 11/2013 | Kulkarni | |
| 2013/0321467 | A1 | 12/2013 | Tappen | |
| 2013/0339099 | A1 | 12/2013 | Aidroos | |
| 2013/0339831 | A1 | 12/2013 | Gulanikar | |

(56) References Cited

U.S. PATENT DOCUMENTS

2014/0007005 A1 1/2014 Libin
2014/0012603 A1 1/2014 Scanlon
2014/0025767 A1 1/2014 De Kezel
2014/0036639 A1 2/2014 Taber
2014/0040780 A1 2/2014 Artzt
2014/0040905 A1 2/2014 Tadanobu
2014/0058801 A1 2/2014 Deodhar
2014/0059910 A1 3/2014 Norton
2014/0074536 A1 3/2014 Meushar
2014/0081685 A1 3/2014 Thacker
2014/0089719 A1 3/2014 Daum
2014/0101310 A1 4/2014 Savage
2014/0156539 A1 6/2014 Brunet
2014/0165001 A1 6/2014 Shapiro
2014/0172478 A1 6/2014 Vadasz
2014/0189017 A1 7/2014 Prakash
2014/0200944 A1 7/2014 Henriksen
2014/0208325 A1 7/2014 Chen
2014/0215344 A1 7/2014 Ligman
2014/0229609 A1 8/2014 Wong
2014/0236663 A1 8/2014 Smith
2014/0244334 A1 8/2014 De et al.
2014/0257894 A1 9/2014 Melahn
2014/0279294 A1 9/2014 Field-Darragh
2014/0288987 A1 9/2014 Liu
2014/0310047 A1 10/2014 De
2014/0310051 A1 10/2014 Meng
2014/0343989 A1 11/2014 Martini
2014/0350997 A1 11/2014 Holm
2014/0364987 A1 12/2014 Shikano
2015/0006448 A1 1/2015 Gupta
2015/0007058 A1 1/2015 Wooten
2015/0012330 A1 1/2015 Sugiura
2015/0052437 A1 2/2015 Crawford
2015/0058053 A1 2/2015 De
2015/0113540 A1 4/2015 Rabinovici
2015/0134393 A1 5/2015 De
2015/0153906 A1 6/2015 Liao
2015/0154526 A1 6/2015 Yates
2015/0178666 A1 6/2015 Green
2015/0200966 A1 7/2015 Kasturirangan
2015/0213411 A1 7/2015 Swanson
2015/0215256 A1 7/2015 Ghafourifar
2015/0262111 A1 9/2015 Yu
2015/0312375 A1 10/2015 Valey
2015/0317595 A1 11/2015 De
2015/0339006 A1 11/2015 Chaland
2015/0363092 A1 12/2015 Morton
2015/0363733 A1 12/2015 Brown
2015/0379472 A1 12/2015 Gilmour
2016/0012368 A1 1/2016 O'Connell
2016/0034844 A1 2/2016 Kofman
2016/0048408 A1 2/2016 Madhu
2016/0048786 A1 2/2016 Fukuda
2016/0063192 A1 3/2016 Johnson
2016/0063449 A1 3/2016 Duggan
2016/0072750 A1 3/2016 Kass
2016/0092045 A1 3/2016 Lamas
2016/0110670 A1 4/2016 Chatterjee
2016/0124775 A1 5/2016 Ashtiani
2016/0140474 A1 5/2016 Vekker
2016/0140501 A1 5/2016 Figlin
2016/0147773 A1 5/2016 Smith
2016/0147846 A1 5/2016 Smith
2016/0148157 A1 5/2016 Walia
2016/0180277 A1 6/2016 Skiba
2016/0180298 A1 6/2016 Mcclement
2016/0182311 A1 6/2016 Borna
2016/0188145 A1 6/2016 Gabor
2016/0216854 A1 7/2016 Mcclellan
2016/0224939 A1 8/2016 Chen
2016/0234391 A1 8/2016 Wolthuis
2016/0275436 A1 9/2016 Kurjanowicz
2016/0313934 A1 10/2016 Isherwood
2016/0328217 A1 11/2016 Hagerty
2016/0342927 A1 11/2016 Reznik
2017/0004213 A1 1/2017 Cunico
2017/0009387 A1 1/2017 Ge
2017/0017364 A1 1/2017 Kekki
2017/0017924 A1 1/2017 Kashiwagi
2017/0039503 A1 2/2017 Jones
2017/0061341 A1 3/2017 Haas
2017/0068933 A1 3/2017 Norton
2017/0093871 A1 3/2017 Abuelsaad
2017/0093874 A1 3/2017 Uthe
2017/0099296 A1 4/2017 Fisher
2017/0103369 A1 4/2017 Thompson
2017/0116552 A1 4/2017 Deodhar
2017/0132200 A1 5/2017 Noland
2017/0153799 A1 6/2017 Hoyer
2017/0154024 A1 6/2017 Subramanya
2017/0177671 A1 6/2017 Allgaier
2017/0185592 A1 6/2017 Frei
2017/0192642 A1 7/2017 Fishman
2017/0206217 A1 7/2017 Deshpande
2017/0237745 A1 8/2017 Desai
2017/0249577 A1 8/2017 Nishikawa
2017/0316367 A1 11/2017 Candito
2017/0317898 A1 11/2017 Candito
2017/0323233 A1 11/2017 Bencke
2017/0323267 A1 11/2017 Baek
2017/0323350 A1 11/2017 Laderer
2017/0344754 A1 11/2017 Kumar
2017/0346861 A1 11/2017 Pearl
2017/0351385 A1 12/2017 Ertmann
2018/0032524 A1 2/2018 Byron
2018/0052943 A1 2/2018 Hui
2018/0053127 A1 2/2018 Boileau
2018/0059910 A1 3/2018 Wooten
2018/0060785 A1 3/2018 Carnevale
2018/0060818 A1 3/2018 Ishiyama
2018/0063063 A1 3/2018 Yan
2018/0068271 A1 3/2018 Abebe
2018/0075387 A1 3/2018 Kulkarni
2018/0088754 A1 3/2018 Psenka
2018/0089625 A1 3/2018 Rosati
2018/0095938 A1 4/2018 Monte
2018/0102989 A1 4/2018 Borsutsky
2018/0131649 A1 5/2018 Ma
2018/0157477 A1 6/2018 Johnson
2018/0165610 A1 6/2018 Dumant
2018/0173386 A1 6/2018 Adika
2018/0189706 A1 7/2018 Newhouse
2018/0189736 A1 7/2018 Guo
2018/0225795 A1 8/2018 Napoli
2018/0247352 A1 8/2018 Rogers
2018/0260081 A1 9/2018 Beaudoin
2018/0262620 A1 9/2018 Wolthuis
2018/0284985 A1* 10/2018 Bansal .................... G06F 3/067
2018/0285471 A1 10/2018 Hao
2018/0316636 A1 11/2018 Kamat
2018/0331842 A1 11/2018 Faulkner
2018/0357049 A1 12/2018 Epstein
2018/0367477 A1 12/2018 Hariram
2018/0367483 A1 12/2018 Rodriguez
2018/0373804 A1 12/2018 Zhang
2019/0005048 A1 1/2019 Crivello
2019/0014070 A1 1/2019 Mertvetsov
2019/0018552 A1 1/2019 Bloy
2019/0034057 A1 1/2019 Rudchenko
2019/0068390 A1 2/2019 Gross
2019/0079909 A1 3/2019 Purandare
2019/0080289 A1 3/2019 Kreitler
2019/0095839 A1 3/2019 Itabayashi
2019/0095846 A1 3/2019 Gupta
2019/0102700 A1 4/2019 Babu
2019/0138583 A1 5/2019 Silk
2019/0138589 A1 5/2019 Udell
2019/0138961 A1 5/2019 Santiago
2019/0139004 A1 5/2019 Vukovic
2019/0147386 A1 5/2019 Balakrishna
2019/0187987 A1 6/2019 Fauchère
2019/0213509 A1 7/2019 Burleson
2019/0265821 A1 8/2019 Pearl

(56) References Cited

U.S. PATENT DOCUMENTS

| | | | |
|---|---|---|---|
| 2019/0327271 | A1 | 10/2019 | Saxena |
| 2019/0340166 | A1 | 11/2019 | Raman |
| 2019/0340296 | A1 | 11/2019 | Cunico |
| 2019/0340574 | A1 | 11/2019 | Ekambaram |
| 2019/0347094 | A1 | 11/2019 | Sullivan |
| 2019/0347126 | A1 | 11/2019 | Bhandari |
| 2019/0370320 | A1 | 12/2019 | Kalra |
| 2020/0019907 | A1 | 1/2020 | Notani |
| 2020/0059539 | A1 | 2/2020 | Wang |
| 2020/0065736 | A1 | 2/2020 | Relangi |
| 2020/0162315 | A1 | 5/2020 | Siddiqi |
| 2020/0192538 | A1 | 6/2020 | Karpe |
| 2020/0192908 | A1 | 6/2020 | Smith |
| 2020/0193556 | A1 | 6/2020 | Jin |
| 2020/0218551 | A1 | 7/2020 | Sabo |
| 2020/0228474 | A1 | 7/2020 | Cameron |
| 2020/0233879 | A1 | 7/2020 | Papanicolaou |
| 2020/0244611 | A1 | 7/2020 | Rosenstein |
| 2020/0293975 | A1 | 9/2020 | Faulkner |
| 2020/0328906 | A1 | 10/2020 | Raghavan |
| 2020/0344253 | A1 | 10/2020 | Kurup |
| 2021/0004380 | A1 | 1/2021 | Koch |
| 2021/0004381 | A1 | 1/2021 | Smith |
| 2021/0097466 | A1 | 4/2021 | Sabo |
| 2021/0103451 | A1 | 4/2021 | Sabo |
| 2021/0110347 | A1 | 4/2021 | Khalil |
| 2021/0117907 | A1 | 4/2021 | Gray |
| 2021/0136012 | A1 | 5/2021 | Barbitta |
| 2021/0182475 | A1 | 6/2021 | Pelz |
| 2021/0216562 | A1 | 7/2021 | Smith |
| 2021/0232282 | A1 | 7/2021 | Karpe |
| 2021/0248161 | A1 | 8/2021 | Leston |
| 2021/0320891 | A1 | 10/2021 | Rosenstein |
| 2021/0342786 | A1 | 11/2021 | Jiang |
| 2021/0382734 | A1 | 12/2021 | Rosenstein |
| 2022/0019320 | A1 | 1/2022 | Sabo |
| 2022/0058548 | A1 | 2/2022 | Garg |
| 2022/0075792 | A1 | 3/2022 | Koch |
| 2022/0078142 | A1 | 3/2022 | Cameron |
| 2022/0158859 | A1 | 5/2022 | Raghavan |
| 2023/0161955 | A1 | 5/2023 | Pelz |
| 2025/0094696 | A1 | 3/2025 | Pelz |

FOREIGN PATENT DOCUMENTS

| | | | |
|---|---|---|---|
| CN | 102378975 | B | 5/2015 |
| WO | 2015036817 | A1 | 3/2015 |
| WO | 2015123751 | A1 | 8/2015 |
| WO | 2020006634 | A1 | 1/2020 |

OTHER PUBLICATIONS

"Rules of Data Conversion from Document to Relational Databases", published: 2014, publisher: Future-processing, pp. 1-8 (Year: 2014).
Critical chain project management, Wikipedia, archives org, Dec. 17, 2016 https://web.archive.Org/web/20161217090326/https://en.wikipedia.org/wiki/Critical_chain_project_management (Year: 2016) 5 pages.
Critical Path Method, Wikipedia, archives org, Sep. 19, 2017 https://web.archive.Org/web/20170919223814/https://en.wikipedia.org/wiki/Critical_path_method (Year: 2017) 6 pages.
Fruhlinger, Joshua. "The Best To-Do ListApps for Feeling Productive; With the right app, feeling productive can be just as gratifying as actually getting things done" Wall Street Journal (Online); New York, N.Y. [New York, N.Y]Nov. 8, 2013 (Year: 2013) 4 pages.
Helen Mongan-Rallis & Terrie Shannon, "Synchronous Chat," Aug. 2016, Dept. of Education, Univ. of MN Duluth, web.archive.org/web/20160825183503/https://www.d.umn.edu/hrallis/professional/presentations/cotfsp06/indiv_tools/sync_chat.htm (Year: 2016) (2 pages).
Wix.com, How to Use Wix Code with Marketing Tools to Create Custom Events, Oct. 18, 2018, YouTube, https://www.youtube.com/watch?v=MTBVykOYGvO&feature=emb_title, 2 pages.
www.asana.com (as retrieved from https://web.archive.Org/web/20160101054536/https://asana.com/press and https://web.archive.org/web/20160101054527/https://asana.com/product) (Year: 2016) 15 pages.
"U.S. Appl. No. 14/584,750, Examiner Interview Summary mailed Feb. 25, 2016", 3 pgs.
"U.S. Appl. No. 14/584,750, Non Final Office Action mailed Aug. 28, 2015", 21 pgs.
"U.S. Appl. No. 14/584,750, Notice of Allowance mailed Mar. 28, 2016", 8 pgs.
"U.S. Appl. No. 14/584,750, Response filed Feb. 29, 2015 to Non Final Office Action mailed Aug. 28, 2015", 16 pgs.
"U.S. Appl. No. 14/584,850, Final Office Action mailed Sep. 1, 2017", 31 pgs.
"U.S. Appl. No. 14/584,850, Non Final Office Action mailed Jan. 10, 2017", 9 pgs.
"U.S. Appl. No. 14/584,850, Response filed Apr. 10, 2017 to Non Final Office Action mailed Jan. 10, 2017", 13 pgs.
Asana Demo and Product Tour, you tube excerpt, Dec. 7, 2017 https://www.youtube.com/watch?v=IMAFWVLGFyw (Year: 2017) (16 pages).
Asana integrations, Asana tutorial, youtube, excerpt, Nov. 16, 2016 https://www.youtube.com/watch?v=hBiQ7DJNinE (Year: 2016) (21 pages).
Asana Workload and Portfolios,youtube,excerpt, Aug. 1, 2019 https://www.youtube.com/watch?v=7XkNcfFDG6M (Year: 2019) (20 pages).
Asana YouTube channel, list of all product videos, Nov. 19, 2014-Aug. 19, 2019 https://www.youtube.com/user/AsanaTeam/videos?disable_polymer=1 (Year: 2019) (5 pages).
Asana, Task dependencies, archives org, Aug. 25, 2017 https://web.archive.org/web/20170825002141/https://asana.com/guide/help/tasks/dependencies (Year: 2017) (5 pages).
Asana, Manage your team capacity with Workload, youtube, excerpt, Aug. 1, 2019 https://www.youtube.com/watch?v=2ufXyZDzZnA&list=PLJFG93oi0wJAi UwyOhIGWHdtJzJrzyIBv (Year: 2019) (1 page).
Biggs, "GateGuru Relaunches With New Ways to Streamline Your Travel Experience", Techcrunch, (Apr. 26, 2013), 3 pgs.
Castaneda Samuel, Introduction Manual—Asana, Sep. 25, 2017 https://static1.squarespace.com/static/586d532ae58c6232db243a65/t/5c210c10f950b7fc7a8e3274/1545669658049/Asana+Manual.pdf (Year: 2017) (20 pages).
How to Asana Asana time tracking, youtube, excerpt, May 24, 2017 https://www.youtube.com/watch?v=z91qlex-TLc (Year: 2017) (1 page).
How to Asana, Asana project management, youtube, excerpt, Mar. 7, 2017 https://www.youtube.com/watch?v=qqANMTvVpE (Year: 2017) (28 pages).
How to Asana, Creating your first Asana project, youtube, excerpt, Jan. 31, 2017 https://www.youtube.com/watch?v=L04WmcUdsLo (Year: 2017) (1 page).
How to Asana, Getting Asana into your workflow, youtube, excerpt, Jul. 17, 2017 https://www.youtube.com/watch?v=7YLrNMdv3o (Year: 2017) (24 pages).
How to Asana, Planning with Asana calendar, youtube excerpt, Feb. 14, 2017 https://www.youtube.com/watch?v=w816KYiVPyc (Year: 2017) (19 pages).
How to Asana, Using Asana for task management, youtube, excerpt, Feb. 7, 2017 https://www.youtube.com/watch?v=vwvbgiejhQ (Year: 2017) (8 pages).
How to Asana, Visualizing work with Asana kanban boards, youtube, excerpt, Feb. 21, 2017 https://www.youtube.com/watch?v=jmZaZGydfPY (Year: 2017) (41 pages).
How to Asana, Workflow management, youtube, excerpt, May 30, 2017 https://www.youtube.com/watch?v=rk8nPWmXsRo (Year: 2017) (9 pages).
How to use Advanced Search in Asana, Asana tutorial, May 25, 2016 https://www.youtube.com/watch?v=5VyJ3toPfQM (Year: 2016) (28 pages).

(56) References Cited

OTHER PUBLICATIONS

Justin Rosenstein, Unveiling the Future of Asana, Mar. 28, 2018 https://www.youtube.com/watch?v=nRI?d_WM4Bc (Year: 2018) (2 pages).
Prioritize My Tasks in Asana, Asana tutorial, youtube, excerpt, May 25, 2016 https://www.youtube.com/watch?v=UbCnMvw01nl (Year: 2016) (3 pages).
Project views, Asana tutorial, youtube, excerpt May 25, 2016 https://www.youtube.com/watch?v=FYjA8ZH3ceQ (Year: 2016) (5 pages).
Using Asana Premium, Asana tutorial, youtube, excerpt, Sep. 10, 2016 https://www.youtube.com/watch?v=vMgLtDDmyeo (Year: 2016) (4 pages).
Where does Asana fit in, archives org, Jul. 8, 2017 https://web.archive.org/web/20170708150928/https://asana.com/guide/resources/infosheets/where-does-asana-fit (Year: 2017) (5 pages).
www.cogmotive.com/blog/author/alan Alan Byrne: "Creating a company Shared Calendar in Office 365"; pp. 1-17; Sep. 10, 2013 (16 pages).
Command and control, wikipedia, archives org, Mar. 16, 2018 https://web.archive.org/web/20180316193655/https://en.wikipedia.org/wiki/Command_and_control (Year: 2018), 6 pages.
"How to Asana: Inviting teammates to Asana." YouTube, Asana, Mar. 21, 2017, https://www.youtube.com/watch?v=TLOruY1KyxU ( Year: 2017), 13 pages.
Hartmann, "TimeProjectscheduling with resource capacities and requests varying with time: a case study," 2013, Flexible services and manufacturing journal, vol. 25, No. 1, pp. 74-93 (Year: 2013).
Mauricio Aizawa, Zapier, How to Automate Asana Tasks creation using Evernote, youtube excerpts, Mar. 16, 2018 https://www.youtube.com/watch?v=BjDQ4Gny4WI (Year: 2018) (8 pages).
Paul Minors, How to automate your tasks, youtube excerpts, Oct. 18, 2019 https://www.youtube.com/watch?v=lwF9XyUQrzw (Year: 2019).
Assef, F., Cassius, T. S., & Maria, T. S. (2018). Confrontation between techniques of time measurement. Journal of Manufacturing Technology Management, 29(5), 789-810. (Year: 2018).
(Tiburca, Andrew) Best Team Calendar Applications for 2018—Toggl https://toggl.com/blog/best-team-calendar-applications-for-2018 (Year: 2017).
Macro, computer science, wikipedia, archives org, 6 pages, Feb. 11, 2020 http://web.archive.org/web/20200211082902/https://en.wikipedia.org/wiki/Macro_(computer_science) (Year: 2020).
Lauren Labrecque, "Fostering Consumer-Brand Relationships in Social Media Environments: The Role of Parasocial Interaction", 2014, Journal of Interactive Markeing, 28 (2014), pp. 134-148 (Year: 2014).
Dawei Li, "Deepcham: Collaborative Edge-Mediated Adaptive Deep Learning for Mobile Object Recognition", 2016, IEEE/ACM, pp. 64-76. (Year: 2016).
Devon Watts and Nick Fassler, "Now rolling out in beta: Track anything in Asana, with custom fields", publisher: Asana, published: Jul. 12, 2016, pp. 1-7 (Year: 2016).
Fang Chen, R. O. Briggs, "Project Progress Tracking Template—Using a Repeatable GSS Process to Facilitate Project Process Management," Proceedings of the 39th Annual Hawaii International Conference on System Sciences (HICSS'06), Kauai, HI, USA, 2006, p. 17c-17c, doi: 10.1109/HICSS.2006.399. (Year: 2006).
M. Ramzan, M. A. Iqbal, M. A. Jaffar, A. Rauf, S. Anwar and A. A. Shahid, "Project Scheduling Conflict Identification and Resolution Using Genetic Algorithms," 2010 International Conference on Information Science and Applications, Seoul, Korea (South), 2010, pp. 1-6, doi: 10.1109/ICISA.2010.5480400. (Year: 2010).
Ruoming Pang, Ramon Caceres, Mike Burrows, Zhifeng Chen, Pratik Dave, Nathan Germer, Alexander Golynski, Kevin Graney, Nina Kang, Lea Kissner, Jeffrey L. Korn, Abhishek Parmar, Christina D. Richards, and Mengzhi Wang, "Zanzibar: Google's Consistent, Global Authorization System", 2019 USENIX Annual Technical Conference (USENIX ATC '19), Renton, WA, pp. 1-14 (Year: 2019).
Szabolcs de Gyurky; Mark A. Tarbell, "Project and Task Organization," in the Cognitive Dynamics of Computer Science: Cost-Effective Large Scale Software Development IEEE, 2006, pp. 54-79, doi: .1002/0470036443.ch (Year: 2006).

* cited by examiner

SYSTEMS AND METHODS TO IMPLEMENT AN INFORMATION DELETION POLICY FOR INFORMATION MAINTAINING A COLLABORATION ENVIRONMENT

FIELD OF THE DISCLOSURE

The present disclosure relates to systems and methods to implement an information deletion policy for information maintaining a collaboration environment; in particular, a deletion policy that maintains continuity of remaining information.

BACKGROUND

Web-based collaboration environments, sometimes referred to as work management platforms, may enable users to assign projects, tasks, or other assignments to assignees (e.g., other users) to complete. A collaboration environment may comprise an environment in which individual users and/or a virtual team of users does its work and enables the users to work in a more organized and efficient manner when remotely located from each other.

SUMMARY

Hosting a web-based collaboration environment poses many challenges. A collaboration environment may be made up of environment objects describing users of the collaboration environment, units of work managed, created, and/or assigned within the collaboration environment, and/or other information making up the collaboration environment. Many of the environment objects may be connected to other ones of the environment objects through dependencies, hierarchies, and/or other relationships. One technical challenge is the properly handling of environment objects when there is a request to delete information and/or an environment object as a whole. In particular, the relationships established between environment objects pose many challenges as they relate to one or more of what to delete, where to delete information, and/or when to delete information, among others, in response to a request to delete a given environment object and/or information within an environment object.

To address these and/or other problems, one or more implementations presented herein propose an information deletion policy for deleting information maintained by a collaboration environment. In particular, an information deletion policy may be defined in a way that maintains continuity of remaining information and/or environment objects, by implementing policy rules through a cascading process of deletion that steps down into different stages of environment objects based on their relationship with objects slated for deletion. For example, when an environment object is deleted, there should be no references to it by other environment objects. Accordingly, in some implementations, the information deletion policy may cause environment object having reference(s) to a deleted object (e.g., environment objects that are one stage down from the environment object to be deleted) to be removed from an environment object in a way that leaves the environment object valid (e.g., dependent environment objects must be deleted, not left with a null pointer). As used herein, a characterization of “invalid” or “invalid state” for an object may refer to an object which breaks system logic, and/or whose references refer to a deleted object. This process continues to cascade through additional stages until what is left are environment objects identified for deletion, and information within environment object that is identified for nullification. These along with other features and/or functionality presented herein, may be recognized by persons of ordinary skill in the art as providing improvements upon the operation of a collaboration environment including, among others, increased efficiency and management of electronic storage resources, and the accuracy and validity of the collaboration environment itself that prevents crashing or other errors.

In some implementations, deletion of environment objects may initiated by user-initiated requests to delete environment objects, which may prompt and/or initiate the cascading process of the deletion policy. The user-initiated requests may generally result in “soft” deletes, and act more as a “trashing” process which removes information from views of the collaboration environment, but still maintains the environment object somewhere in electronic storage. The deletion policy may then schedule the “trashed” environment objects for a remote job sometime in the future (e.g., 30 days and/or other periods of time) to permanently delete from electronic storage.

One or more implementations of a system to implement an information deletion policy for information maintaining a collaboration environment may include one or more hardware processors configured by machine-readable instructions, non-transitory electronic storage, and/or other components. Executing the machine-readable instructions may cause the one or more hardware processors to facilitate implementing an information deletion policy for information maintaining a collaboration environment. The machine-readable instructions may include one or more computer program components. The one or more computer program components may include one or more of an environment state component, a policy component, a deletion component, and/or other components.

The environment state component may be configured to manage environment state information maintaining a collaboration environment. The collaboration environment may be configured to facilitate interaction by users with the collaboration environment. The environment state information may include environment objects and/or other information. The environment objects may describe one or more of the users, units of work managed, created, and/or assigned within the collaboration environment, and/or other information. The environment state information may be stored in the non-transitory electronic storage.

The policy component may be configured to manage deletion policy information and/or other information. The deletion policy information may define a deletion policy for the environment state information. The deletion policy may indicate a cascading process of deletion of the environment objects based on relationship types with other environment objects slated for deletion. The environment objects slated for deletion may be referred to as “target environment objects.” By way of non-limiting illustration, cascading process may dictate deletion of individual ones of the environment objects having a deletion type relationship with an individual target environment object. By way of non-limiting illustration, cascading process may dictate nullification of information included in the individual ones of the environment objects having a nullification type relationship with the individual target environment object. The deletion policy information may be stored in the non-transitory electronic storage.

The deletion component may be configured to implement the deletion policy. By way of non-limiting illustration, the deletion component may be configured to identify the target environment objects to be deleted. The deletion component may be configured to identify the environment objects having relationships with the target environment objects. The deletion component may be configured to classify the relationships based on the relationship types. This part of the process may be referred to as a first "stage."

The deletion component may be configured to perform stage processing at a given stage. By way of non-limiting illustration, at the first stage, for individual ones of the environment objects having the deletion type relationship with the target environment objects, the deletion component may be configured to classify the individual ones of the environment object as secondary target environment objects to be deleted. The identification of the secondary target environment objects may initiate a subsequent stage in the cascade process. In the second stage, for the individual ones of the environment object identified as secondary target environment objects to be deleted, the deletion component may be configured to identify other environment objects having relationships with the secondary target environment objects. For the individual ones of the other environment objects having relationships with the secondary target environment objects, the deletion component may be configured to classify the relationships with the secondary target environment objects based on the relationship types. This is just an example of a few stages of the cascading process. The target environment object may represent a first stage of the process (and may be referred to herein as the "primary" target environment object); the secondary target environment object may represent a second stage of the process; and so on. For example, for individual environment objects having the deletion type relationship with the secondary target environment objects, the deletion component may be configured to perform one or more of classify them as tertiary target environment objects to be deleted (where identification of tertiary target environment objects may initiate a subsequent stage in the cascade process), identify the environment objects having relationships with the tertiary target environment objects, classify the relationships with the tertiary target environment objects based on the relationship types, and/or other operations. In this example, the tertiary target environment objects may represent a third stage of the process. This process may continue until no additional relationships between target environment objects and other environment objects are able to be identified that would result in either deletion of the objects or nullification of information included in the objects.

In some implementations, another way to look at the policy is to consider individual environment objects as nodes, and the nodes are connected by edges, which represent relationships between environment objects. The policy may dictate a process where, at each node, it is determined if the environment object is a target environment object to be deleted. At each node representing a target environment object, neighboring nodes (e.g., environment objects connected to a target environment object through some relationships) connected by edges may be identified and determined if they are also targeted for deletion or information nullification, based on the relationship types. Thus, a cascading process is created.

The deletion component may be configured to delete, from the non-transitory electronic storage, the target environment objects and the environment objects having the deletion type relationship with the target environment objects (e.g., primary, secondary, tertiary, etc.).

The deletion component may be configured to, for individual ones of the environment objects having the nullification type relationship with one or more of the target environment objects (e.g., primary, secondary, tertiary, etc.), nullify the information included in the individual ones of the environment objects that references the target environment objects (e.g., primary, secondary, tertiary, etc.). Nullification may include setting information fields to one or more of "zero," "null," or other value that does not cause the environment object to be invalid.

As used herein, any association (or relation, or reflection, or indication, or correspondency) involving servers, processors, client computing platforms, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the", include plural referents unless the context clearly dictates otherwise.

DETAILED DESCRIPTION

Figure 1:
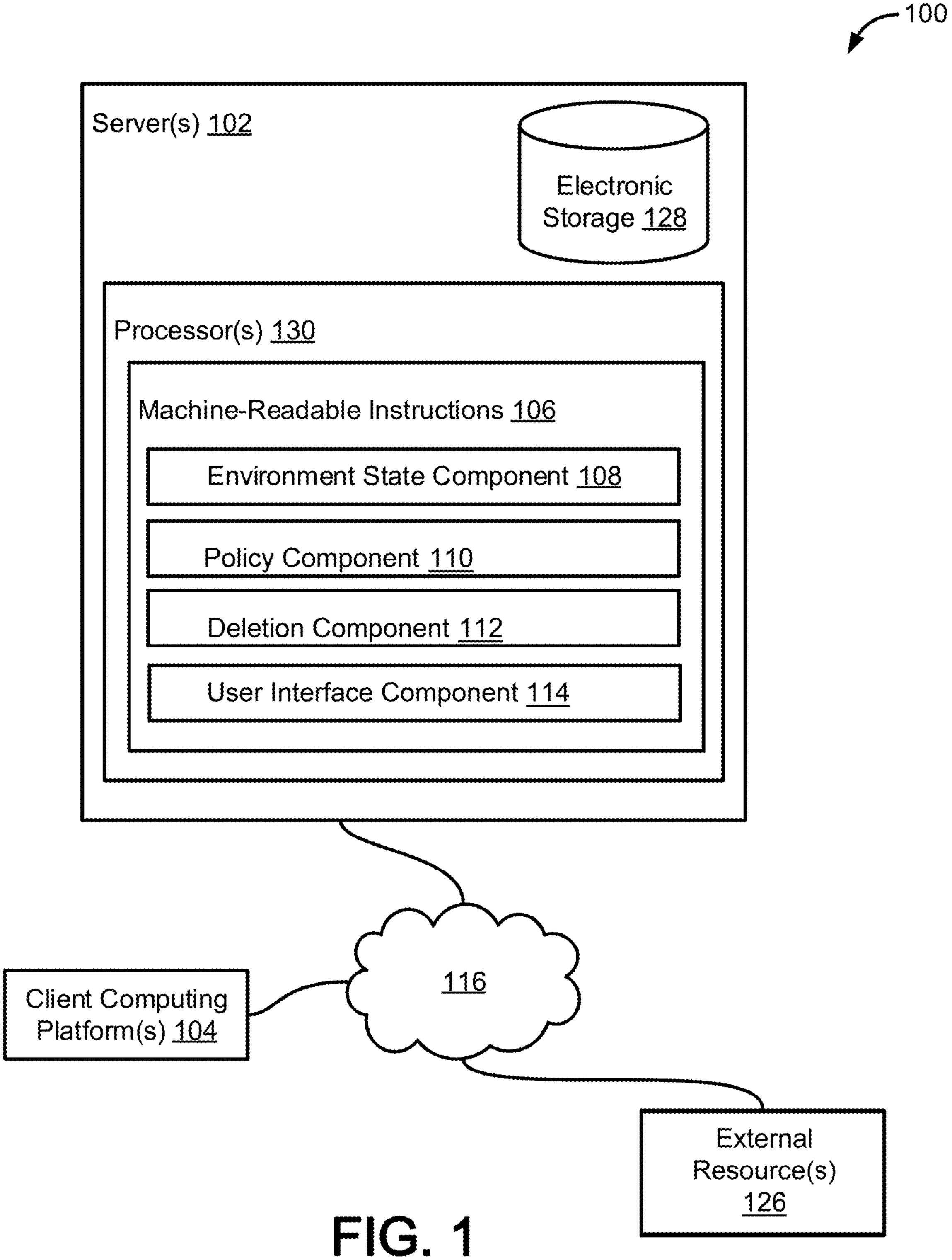
FIG. 1 illustrates a system configured to implement an information deletion policy for information maintaining a collaboration environment, in accordance with one or more implementations.

FIG. 1 illustrates a system 100 configured to implement an information deletion policy for information maintaining a collaboration environment, in accordance with one or more implementations. In some implementations, the information deletion policy may cause environment objects having reference(s) to a deleted object (e.g., environment objects that are one stage down from the environment object to be deleted) to be removed from an environment object in a way that leaves the environment object valid (e.g., dependent environment objects must be deleted, not left with a null pointer). This process continues to cascade through additional stages until what is left are environment objects identified for deletion, and information within environment object that is identified for nullification.

In some implementations, system 100 may include one or more of one or more servers 102, one or more client computing platforms 104, external resource(s) 126, and/or other components. Server(s) 102 may be configured to communicate with one or more client computing platforms 104, one or more external resources 126, and/or other entities of system 100 according to a client/server architecture and/or other architectures. Client computing platform(s) 104 may be configured to communicate with other client computing platforms via server(s) 102 and/or according to a peer-to-peer architecture and/or other architectures. Users may access system 100 and/or instances of the collaboration environment via client computing platform(s) 104. Server(s) 102 may be remote from client computing platform(s) 104. Client computing platform(s) 104 may be remote from each other.

Server(s) 102 may include one or more of non-transitory electronic storage 128, one or more processors 130 configured by machine-readable instructions 106, and/or other components. The non-transitory electronic storage 128 may store one or more records and/or other information. Machine-readable instructions 106 may include one or more instruction components. The instruction components may include computer program components. Executing the machine-readable instructions 106 may cause server(s) 102 to facilitate generating records within a collaboration environment. The computer program components may include one or more of an environment state component 108, policy component 110, a deletion component 112, a user interface component 114, and/or other components.

The non-transitory electronic storage 128 may be configured to store information used by system 100 and/or one or more components of system 100. By way of non-limiting illustration, the non-transitory electronic storage 128 may store one or more of environment state information maintaining a collaboration environment (see, also, environment state component 108), deletion policy information defining a deletion policy for the environment state information (see, also, policy component 110), and/or other information.

Environment state component 108 may be configured to manage environment state information and/or other information used in maintaining a collaboration environment. The collaboration environment may be configured to facilitate interaction by users with the collaboration environment. The environment state information may include environment objects. The environment objects may describe one or more of users of the collaboration environment, units of work managed, created, and/or assigned within the collaboration environment, and/or other information making up the collaboration environment. The environment objects may reflect programming based on an object-oriented design architecture. Benefits of object-oriented design may include one or more of modularity, quick development, and/or ease-of-use. However, other programming language may be contemplated within the scope of the present disclosure.

The environment objects may come in the form of records of information. The records may include one or more of user records, work unit records, and/or other records. The user records may include user information describing the users of the collaboration environment. The work unit records may include work unit information describing units of work assigned to, created by, and/or managed by the users within the collaboration environment.

The user information in the user records may include values of user parameters and/or other information. The values of the user parameters may be organized in the user records corresponding to users interacting with and/or viewing the collaboration environment. The values of the user parameters may include information describing and/or identifying the users, their actions within the collaboration environment, their settings, metadata associated with the users, work they are members of and/or collaborate on, and/or other user information. Individual ones of the users may be associated with individual ones of the user records. A user record may define values of the user parameters associated with a given user.

The values of the user parameters may, by way of non-limiting example, specify one or more of: a user name, a group, a user account, user role information, a user department, descriptive user content, a to-email, a from-email, a photo, an organization, a workspace, one or more user comments, one or more teams the user belongs to, one or more of the user display settings (e.g., colors, size, project order, task order, other unit of work order, etc.), work inclusion information (e.g., identification of work unit records they are members of and/or collaborate on), one or more authorized applications, one or more interaction parameters (e.g., indicating a user is working on/worked on a given unit of work, a given user viewed a given work unit of work, a given user selected a given unit of work, a timeframe a given user last interacted with and/or worked on a given unit of work, a time period that a given unit of work has been idle, and/or other interaction parameters), one or more notification settings, one or more progress parameters, status information for one or more work units the user is associated with (units of work assigned to the user, assigned to other users by the user, completed by the user, past-due date, and/or other information), one or more performance/productivity metrics of a given user (e.g., how many units of work the user has completed, how quickly the user completed the units of work, how quickly the user completes certain types of work units, the efficiency of the user, bandwidth of the user, activity level of the user, how many business objectives the user has helped fulfill through their completion of units of work, etc.), application access information (e.g., username/password for one or more third-party applications), one or more favorites and/or priorities, schedule information, and/or other information.

Schedule information for the individual users may include one or more calendar entries associated with the individual users. The individual calendar entries may be associated with individual start dates and individual end dates. In some implementations, schedule information may be stored locally within electronic storage 128 by virtue of features and/or functionality provided within a collaboration environment. By way of non-limiting illustration, a collaboration environment may have features and/or functionality of a calendar application configured to facilitate calendaring entries into a schedule. It is noted that schedule information may be determined through features and/or functionality provided by one or more external resources 126. By way of non-limiting illustration, external resources may include a calendar application which may be external to a collaboration environment. The collaboration environment may have permissions to access the external calendar application to determine and/or obtain schedule information.

Work inclusion information may include identification(s) of work unit records that individual users are members of, and/or collaborate with one or more other users on.

Collaboration between users may include performing shared and/or cooperative actions within the collaboration environment to complete one or more of the units of work. The shared and/or cooperative actions may include one or more of communication actions, work completion actions, and/or other actions. One or more implementations of the present disclosure may be configured to leverage the fact that users may be interacting with the collaboration environment and/or each other in synchronous and/or asynchronous ways using remotely located client computing platforms. For example, a user may log into the collaboration environment and perform one or more actions and then sign out. The user may log in at a later date and notice that the collaboration environment has changed due to changes that were made by one or more other users while they were signed out. Accordingly, collaboration between users may have been occurring with or without any direct knowledge of other user's actions within the collaboration environment.

The work unit information in the work unit records may include values of one or more work unit parameters and/or other information. The values of the work unit parameters may be organized in work unit records corresponding to units of work managed, created, and/or assigned within the collaboration environment. A given unit of work may have one or more assignees, owners, and/or collaborators working on the given work unit. Units of work may include one or more of tasks, projects, objectives, and/or other units of work.

Units of work may be created by a given user for the given user and/or created by the given user and assigned to one or more other users. Units of work may be created by a given user for the given user and/or created by the given user and managed by one or more other users. Tasks may include to-do items and/or action items one or more users should accomplish and/or plan on accomplishing in order to complete a task. Individual units of work may include and/or may be associated with one or more digital content items. An individual unit of work may include an individual digital content item by virtue of the individual digital content item (and/or a copy or instance thereof) being attached and/or appended thereto. A digital content item may include one or more of an image, a video, an audio file, a PDF, a word document, and/or other digital content items.

In some implementations, units of work created by, assigned to, and/or completed by the users may refer generally to a linking of the units of work with the individual users in the collaboration environment. A unit of work may be linked with a user in a manner that defines one or more relationships between the user and the unit of work. Such a relationship may connote and/or be a result of an action (past, present, and/or future) of the user with respect to the unit of work. Such actions may include one or more of creating a work unit record for a unit of work, being assigned to participate in a unit of work, participating in a unit of work, being granted access to a work unit record of a unit of work, adjusting a value of a work unit parameter of a work unit record of a unit of work, being assigned a role at the unit of work level, and/or other actions.

Individual sets of work unit records may be defined by a record hierarchy. A record hierarchy may convey individual positions of work unit records (and their corresponding units of work) in the record hierarchy. By way of non-limiting illustration, a position may specify one or more of a work unit record being superior to another work unit record, a work unit record being subordinate to another work unit record, and/or other information. As a result, individual work unit records in the individual sets of work unit records may be subordinate to other individual work unit records in the individual sets of work unit records. For example, a work unit record may define a unit of work comprising a task, and a subordinate work unit record may define a unit of work comprising a sub-task to the task. A record hierarchy may define a relationship between work unit records. A work unit record may have some restrictions placed on it by virtue of having a subordinate work unit record. By way of non-limiting illustration, a work unit record may be restricted from access (or restricted from marking complete) by one or more users unless and/or until a subordinate work unit record is completed and/or started. In some implementations, record hierarchies and dependencies may go hand-in-hand. For example, a superior work unit record may be dependent on a subordinate work unit record. Further, the superior work unit record may be restricted from access (and/or restricted from marking complete) unless and/or until the subordinate work unit record is completed and/or started because the superior work unit record in dependent on the subordinate work unit record.

Individual work unit records may include hierarchical information defining a record hierarchy of the individual work unit records. The hierarchical information of a work unit record may include one or more of information identifying other work unit records associated in a record hierarchy the work unit record belongs to, a specification of the position of the work unit record in the hierarchy, restrictions and/or other relationships placed on the work unit record by virtue of its position, and/or other information.

In some implementations, values of work unit parameters may specify one or more of a unit of work name, a unit of work description, user role information, one or more unit of work dates (e.g., a start date, a due date or end date, a completion date, and/or dates), project inclusion (e.g., identification of projects supported by the individual units of work), objective inclusion (e.g., identification of objectives supported by the individual units of work), one or more members associated with a unit of work (e.g., an owner, one or more collaborators, collaborator access information, and/or other unit of work collaborators and/or collaborator information), completion state, one or more user comment parameters (e.g., permission for who may make comments such as an assignee, an assignor, a recipient, one or more followers, and/or one or more other interested parties; content of the comments; one or more times; presence or absence of the functionality of up-votes; one or more hard-coded responses; and/or other parameters), one or more interaction parameters (e.g., indicating a given unit of work is being worked on/was worked on, a given work unit of work was viewed, a given unit of work was selected, how long the given unit of work has been idle, a last interaction parameter indicating when and what user last interacted with the given unit of work, users that interacted with the given unit of work, quantity and/or content of comments on the unit of work, and/or other interaction parameters indicating sources of the interactions, context of the interactions, content of the interactions and/or time for the interactions), one or more digital content item attachments, notification settings, privacy, an associated URL, one or more interaction parameters (e.g., sources of the interactions, context of the interactions, content of the interactions, time for the interactions, and/or other interaction parameters), updates, state of a workspace for a given unit of work (e.g., application state parameters, application status, application interactions, user information, and/or other parameters related to the state of the workspace for a unit of work), one or more performance/productivity metrics for a given unit of work, hierarchical information, dependency information, one or more custom fields (e.g., priority, cost, stage, and/or other custom fields), and/or other information.

In some implementations, work unit parameters may include one or more of a work assignment parameter, a work completion parameter, a work management parameter, a work creation parameter, a dependency parameter, a grouping parameter, and/or other parameters. The values of the work assignment parameter may describe assignees of individual units of work. The values of the work management parameter may describe users who manage individual units of work and/or the extent in which they manage. The values of the work creation parameter may describe creation characteristics of individual units of work. The creation characteristics may include who created the work unit record, when it was created, and/or other information.

In some implementations, values of a dependency parameter may describe whether a given unit of work is dependent on one or more other units of work. A unit of work being dependent on an other unit of work may mean have one or more restrictions placed on it. By way of non-limiting illustration, the unit of work may not be completed, started, assigned, and/or have other interactions performed in relation to the unit of work unless and/or until some action is performed and/or completed on the other unit of work. By way of non-limiting illustration, a unit of work may not be started until another unit of work is completed, meaning the unit of work may be dependent on the other unit of work. In some implementations, values of the dependency parameter may go hand in hand with the hierarchical information. By way of non-limiting illustration, a unit of work that is subordinate to an other unit of work may be dependent on the other unit of work, or vice versa.

The values of the work assignment parameter describing assignment of users to units of work may be determined based on one or more interactions by one or more users with a collaboration environment. In some implementations, one or more users may create and/or assign one or more unit of work to themselves and/or another user. In some implementations, a user may be assigned a unit of work and the user may effectuate a reassignment of the unit of work from the user or one or more other users.

In some implementations, values of the work completion parameter may indicate that a completion status of a unit of work has changed from "incomplete" to "marked complete" and/or "complete." In some implementations, a status of complete for a unit of work may be associated with the passing of an end date associated with the unit of work. In some implementations, a status of "marked complete" may be associated with a user providing input via the collaboration environment at the point in time the user completes the unit of work (which may be before or after an end date). In some implementations, a completion status may include one or more of "rejected," "revisions required," "incomplete," and/or other statuses. By way of non-limiting illustration, for units of work that require one user to review work by another user, additional user interface elements may be presented where users can set the status as one or more of "marked complete," "incomplete," "rejected," "revisions required," and/or other statuses. In some implementations, a status of rejected for a unit of work may be associated with the passing of an end date associated with the unit of work without the work having been marked complete manually. In some implementations, a status of rejected for a unit of work may be associated with a user specifying the unit of work as rejected. In some implementations, a status of revisions required for a unit of work may be associated with a user specifying that the work being reviewed requires changes, but is otherwise approved. In some implementations, a status of revisions required may present the reviewing user with options to specify what revisions are required. In some implementations, a status of revisions required may cause a follow up unit of work to be generated which is assigned back to the assignor of the original work.

In some implementations, values of a grouping parameter may describe whether a given unit of work supports (e.g., is included in) a project and/or objective. The values may specify one or more of a name/title of another work unit record (e.g., project, objective, other work unit records commonly included in a group), a name/username of an owner of another work unit record, and/or other information.

In some implementations, managing the environment state component 108 may include maintaining queues of the units of work assigned to the users. The queues may be presented to the users in a user interface of the collaboration environment to facilitate access to the units of work via work unit pages. Individual queues may represent the units of work assigned to individual users organized in an order based on the individual end dates and/or other dates (e.g., start dates) and/or other ordering. Individual queues may be presented in a user interface based on one or more spatial arrangements. The particular spatial arrangement used by a user may be stored as part of a user record for the user. The spatial arrangements may include one or more of a list view, a calendar view, a board view, and/or other views. The list view may include a vertical arrangement of graphic icons representing work unit records. The calendar view may be a calendar view by week, by more than one week (e.g., $1^{st}$ through $15^{th}$) by month, by more than one month (e.g., May through July), and/or other calendar views. Units of work may be represented in a calendar view by user interface elements (e.g., icons, calendar entries, etc.). The board view may include a grid of cells comprising columns and rows, where visual content item (e.g., icons) representing work unit records may be positioned in the cells. Columns may be associated with sections (e.g., different hierarchies, groupings, etc.), and the cells within the column may be populated with visual content item representing work unit records that are associated with the sections.

In some implementations, environment state component 108 may be configured to manage information defining work unit pages (sometimes referred to simply as "pages") corresponding to the individual units of work. Individual work unit pages may provide access to individual units of work and/or their records. Managing information may include one or more of determining, obtaining, receiving, requesting, checking, storing, modifying, and/or other operations. Managing information defining individual work unit pages may include providing information to client computing platform(s) to effectuate presentation of the work unit pages, and/or other information. In some implementations, individual work unit pages may include individual sets of interface elements displaying the values of one or more of the work unit parameters of the individual units of work.

Users may access work unit records via the work unit pages to perform actions such as one or more of viewing, adding, changing, deleting, and/or otherwise interacting with values of work unit parameters stored by the work unit records. In some implementations, work unit pages providing access to tasks may be referred to as task pages; work unit pages providing access to projects may be referred to as project pages; and work unit pages providing access to objectives may be referred to as objective pages. In some implementations, user pages may include views of the collaboration environment that provide access to user records.

In some implementations, work unit records may define tasks. The work unit information that defines tasks may be referred to as task information and/or other information. The work unit records defining tasks may be referred to as task records. Task information may include values of work unit parameters for tasks managed within the collaboration environment. The work unit parameters for tasks may be referred to as "task parameters." The work unit parameters comprising tasks parameters may be specific to tasks and/or may include one or more parameters not shared with projects, objectives, and/or other records. The task parameters may characterize one or more tasks created, assigned, and/or managed within the collaboration environment and/or via the collaboration environment, and/or the metadata associated with the one or more tasks.

In some implementations, work unit records may define projects. The work unit information that defines projects may be referred to as project information and/or other information. The work unit records defining projects may be referred to as project records. Project information may include values of work unit parameters for projects managed within the collaboration environment. The work unit parameters for projects may be referred to as "project parameters." The work unit parameters comprising project parameters may be specific to project records and may include one or more parameters not shared with tasks, objectives, and/or other records. The project parameters may characterize one or more projects created, owned, assigned, and/or managed within the collaboration environment and/or via the collaboration environment, and/or the metadata associated with the one or more projects. Individual ones of the projects may be associated with individual ones of the records. A given project may have one or more owners and/or one or more collaborators working on the given project. The given project may be associated with one or more other units of work assigned to one or more users under the given project heading. In some implementations, projects may be associated with one or more units of work that may directly facilitate progress toward fulfillment of the projects. Accordingly, completion of units of work may directly contribute to progress toward fulfillment of the project. By way of non-limiting illustration, an individual project may be associated with a client, and the units of work under the individual project heading may be work directly contributing to the fulfillment of a business relationship with the client.

The values of the project parameters may, by way of non-limiting example, include one or more of: one or more units of work associated with individual ones of the projects (which may include values of other work unit parameters defined by one or more work unit records), status information, user role information, one or more user comment parameters (e.g., a creator, a recipient, one or more followers, one or more other interested parties, content, one or more times, upvotes, other hard-coded responses, etc.), a project name, a project description, one or more project dates (e.g., a start date, a due date, a completion date, and/or other project dates), one or more project collaborators (e.g., an owner, one or more other project collaborators, collaborator access information, and/or other project collaborators and/or collaborator information), one or more attachments, notification settings, privacy, an associated URL, one or more interaction parameters (e.g., sources of the interactions, context of the interactions, content of the interactions, time for the interactions, and/or other interaction parameters), updates, ordering of units of work within the given project, state of a workspace for a given task within the given project, and/or other information.

In some implementations, work unit records may define objectives. The work unit information defining objectives may be referred to as objective information. The work unit records defining tasks may be referred to as objective records. The objective information may include values of one or more work unit parameters that define the objectives. The values of the work unit parameters may be organized in objective records corresponding to objectives (sometimes referred to as "business objectives") managed, created, and/or owned within the collaboration environment. The work unit parameters corresponding to objectives may be referred to as "objective parameters." The work unit parameters comprising objective parameters may be specific to objectives and may include one or more parameters not shared with tasks and/or projects. A given objective may have one or more collaborators, and/or team members working on the given objective. Objectives may be associated with one or more units of work one or more users should accomplish and/or plan on accomplishing. Objectives may be created by a given user for the given user and/or created by the given user and assigned to be owned to one or more other users. Individual objectives may include one or more of an individual goal, an individual sub-goal, and/or other business objectives assigned to be owned by a user and/or associated with one or more users.

The objectives may be associated with a set of units of work that may indirectly facilitate progress toward fulfillment of the objectives. The set of units of work may not directly contribute to the progress. By way of non-limiting illustration, a connection between the set of units of work and a corresponding objective may be indirect in that completion of at least one of the units of work may have no direct impact on progress toward fulfillment of the objective. The concept of "no direct impact" may mean that completion of the at least one unit of work may not cause progress toward fulfillment of the business objective without independent action outside of the at least one unit of work and/or project. Instead, the fulfillment of the at least one unit of work may make such independent action more likely (e.g., through coercion, assistance, education, incentivization, reminder, etc.). However, in some implementations, objectives may be associated with one or more units of work that may directly facilitate progress toward fulfillment of the objectives. Accordingly, completion of the set of units of work may directly contribute to the progress toward fulfillment. Objectives may be associated with an objectives and key result (OKR) goal-setting framework. Objectives may be specified on one or more of a team basis, organization basis, and/or other specifications. In some implementations, objectives may be characterized as user objectives. User objectives may be specified on an individual user basis. A user objectives may be associated with a set of units of work assigned to a user that may indirectly (and/or directly) facilitate progress toward fulfillment of the user objective.

In some implementations, objectives may be described based on one or more of a business objective name, a business objective description, one or more business objective dates (e.g., a start date, a due date, and/or dates), one or more members associated with a business objective (e.g., an owner, one or more other project/task members, member access information, and/or other business objective members and/or member information), progress information (e.g., an update, a hardcoded status update, a measured status, a progress indicator, quantity value remaining for a given business objective, completed work units in a given project, and/or other progress information), one or more interaction parameters, notification settings, privacy, an associated URL, one or more custom fields (e.g., priority, cost, stage, and/or other custom fields), and/or other information.

The values of the objective owner parameter describing objectives owned by the individual users may be determined based on one or more interactions by one or more users with a collaboration environment. In some implementations, one or more users may create and/or assign ownership of one or more objectives to themselves and/or another user. In some implementations, a user may be assigned to own an objective and the user may effectuate a reassignment of ownership of the objective from the user or one or more other users.

Progress information for the individual objectives may convey progress toward fulfillment of the individual objectives. In some implementations, the progress toward fulfillment of the business objectives may be specified as one or more of a quantitative value, a qualitative value, and/or other information. In some implementations, the quantitative value may be a percentage of completion, an integer value, a dollar amount, and/or other values. In some implementations, progress toward fulfillment of the individual objectives may be determined independently from incremental completion of the units of work associated with the individual objectives. The completion of the units of work associated with a given objective may not directly progress the given business objective toward fulfillment, but completing the units of work may make accomplishing the business objective more likely (e.g., through coercion, assistance, education, incentivization, reminder, etc.). However, in some implementations, progress toward fulfillment of the individual business objectives may be directly determined based on incremental completion of the units of work in the individual sets of units of work associated with the individual business objectives.

User role information may specify one or more roles of individual users. A role may represent a position of an individual user. A role may represent one or more of how a user works, how a user is expected to work, how a user intends to work, and/or other considerations. The position may be specified based on a description of one or more of a job title, level, and/or other descriptions of position. A role may be specified with respect to a business organization as a whole and/or other specifications. By way of non-limiting illustration, a role may include one or more of the following: chief executive officer (or other officer), owner, manager, supervisor, accountant, associate, employee, intern, entry level, midlevel, senior, administrator, director, foreman, engineer, product developer, human resource officer, artist, art director, and/or other descriptions.

In some implementations, user role information may specify roles of the users within work unit records. A role may convey expected contribution of a user in completing and/or supporting a unit of work. By way of non-limiting illustration, a role within a work unit record may include one or more of owner, manager, creator, reviewer, approver, final decision maker, assignee, assignor, helper, liaison, and/or other descriptions. The individual roles of individual users within some units of work (e.g., a task) may be specified separately from the individual roles of the individual users within other units of work (e.g., a project associated with the task). The individual roles of individual users within the work unit records may be specified separately from the individual roles of the individual users within a business organization as a whole. For example, a business owner may have an "owner" role with respect to a business organization as a whole, while having a "reviewer" role within a project.

In some implementations, environment state information may be continually monitored and/or updated as users interact with the collaboration environment over time. The environment state component 108 may store and/or archive the environment state information continuously, periodically, and/or based on user request to archive. The stored and/or archived environment state information may be referred to as historical environment state information and/or other information.

The policy component 110 may be configured to manage deletion policy information and/or other information. The deletion policy information may define a deletion policy for the environment state information. The deletion policy may indicate a cascading process of deletion of the environment objects based on relationship types with other environment objects slated for deletion. The environment objects slated for deletion may be referred to as "target environment objects." By way of non-limiting illustration, cascading process may dictate deletion of individual ones of the environment objects having a deletion type relationship with an individual target environment object. By way of non-limiting illustration, cascading process may dictate nullification of information included in the individual ones of the environment objects having a nullification type relationship with the individual target environment object. The deletion policy information may be stored in the non-transitory electronic storage.

A deletion type relationship between an environment object and an other environment object may be determined based on the environment object being dependent on the other environment object and/or having other relationships. Dependency may be determined from values of the dependency parameter of the environment objects, record hierarchies, and/or other information.

In some implementations, other relationships that may form a deletion type relationship between an environment object and an other environment object may include concurrent inclusion in an automation scheme. By way of non-limiting illustration, a collaboration environment may implement automation schemes, where user interactions or other changes on one environment object, may trigger one or more automated actions for one or more other environment objects. Accordingly, if an automation scheme dictates that a change in an environment object triggers automated action (s) in an other environment object, the environment object may be considered as having a deletion type relationship with the other environment object.

A nullification type relationship between an environment object and an other environment object is based on one or more of the environment object being independent from the other environment object, the environment object including information that references the other environment object, and/or other information. A nullification type relationship between an environment object and an other environment object is based on the environment object being independent from the other environment object and the environment object including information that references the other environment object. An environment object may be independent from an other environment object by virtue of not being dependent on it. Dependency may be determined from values of the dependency parameter of the environment objects, record hierarchies, and/or other information.

By way of non-limiting illustration, values of a grouping parameter for an environment object and an other environment object may convey that the environment object and the other environment object are included in a common group. For example, the environment object and the other environment object may comprise task records that are managed by a common project record. The environment object and the other environment object may be considered as having a nullification type relationship.

In some implementations, information within an environment object that references an other environment object (sometime referred to as "referential information") may be determined from one or more values of one or more work unit parameters. By way of non-limiting illustration, values of a user comment parameter may define the content of a comment included in an environment object. The content of a comment may include a link (e.g., hyperlink, pointer, etc.) to an other environment object. Thus, the environment object includes referential information, in the form of the comment having the link, that reference the other environment object.

It is noted that the above descriptions of what comprises a nullification type relationship versus a deletion type relationship are provided for illustrative purposes only and are not to be considered limiting. Instead, those skilled in the art may appreciate there may be other relationships or characteristics of environment objects that would lead to either relationship type, as needed for maintaining validity within the collaboration environment when environment objects are slated for deletion, in accordance with the scope of this disclosure.

The deletion component 112 may be configured to obtain user input information and/or other information. The user input information may convey user input into a user interface of the collaboration environment presented at client computing platform(s) 104. The user input may convey user-initiated requests to delete environment objects and/or other information making up the collaboration environment. In response to obtaining the user input information, deletion component 112 may be configured to generate the user-initiated requests. By way of non-limiting illustration, a user interface may display a work unit page of a work unit record. The work unit page may include one or more graphical user interface elements configured to receive user interactions. By way of non-limiting illustration, a user interface element may comprise a virtual button that says "delete" or "trash." In response to obtaining the user-initiated requests, the deletion component 112 may be configured to stage one or more environment objects for deletion and/or perform other operations. In some implementations, staging an environment object for deletion may include performing a "soft" delete. A soft delete of an environment object, also referred to as "trashing," may cause the environment object and/or information included in the environment object to be removed from views of the collaboration environment, but the environment object may still be maintained in electronic storage 128. In some implementations, in response to the user-initiated requests, individual environment object may be classified as primary target environment objects. The deletion policy may then schedule the "trashed" environment objects (that may now be classified as primary target environment objects) for a remote job sometime in the future (e.g., 30 days and/or other periods of time) to permanently delete from electronic storage 128.

The deletion component 112 may be configured to implement the deletion policy. By way of non-limiting illustration, the deletion component 112 may be configured to identify the target environment objects to be deleted. The target environment objects to be deleted may include primary target environment objects which may comprise the environment objects "trashed" based on the user-initiated requests, and/or other environment objects. The deletion component 112 may be configured to identify environment objects having relationships with the target environment objects. The deletion component 112 may be configured to classify the relationships based on the relationship types.

By way of non-limiting illustration, the environment objects may include one or more of a first environment object, a second environment object, a third environment object, a fourth environment object, and/or other environment objects. The deletion component 112 may be configured to identify the first environment object as a first target environment object to be deleted. The deletion component 112 may be configured to identify the second environment object and the third environment object as having relationships with the first environment object. The deletion component 112 may be configured to classify the relationship between the first environment object and the second environment object as a deletion type relationship. The deletion component 112 may be configured to classify the relationship between the first environment object and the third environment object as a nullification type relationship. This part of the process may be referred to as a first "stage."

The deletion component 112 may be configured to perform stage processing at a given stage. The stage processing may generally include identifying other deletion and/or nullification type relationships, and classifying additional environment object(s) as target environment objects. By way of non-limiting illustration, for individual ones of the environment objects having the deletion type relationship with the target environment objects, the deletion component 112 may be configured to classify the individual ones of the environment object as secondary target environment objects to be deleted. The identification of the secondary target environment objects may initiate a second stage in the cascade process. In the second stage, for the individual ones of the environment object identified as secondary target environment objects to be deleted, the deletion component 112 may be configured to identify other environment objects having relationships with the secondary target environment objects. For the individual ones of the other environment objects having relationships with the secondary target environment objects, the deletion component 112 may be configured to classify the relationships with the secondary target environment objects based on the relationship types. In some implementations, the deletion component 112 may be configured to, for individual ones of the environment objects having the deletion type relationship with the target environment objects, perform the following operations in the following order, which generally defines stage processing at a given stage: classify them as secondary target environment objects to be deleted; identify the environment objects having relationships with the secondary target environment objects; and classify the relationships with the secondary target environment objects based on the relationship types.

By way of non-limiting illustration, the deletion component 112 may be configured to classify the second environment object as a secondary target environment object to be deleted. The deletion component 112 may be configured to identify the fourth environment object as having a relationship with the second environment object. The deletion component 112 may be configured to classify the relationship between the fourth environment object and the second environment object as a deletion type relationship.

The above descriptions are illustrate an example of a few stages of a "cascading" process that may comprise more or fewer stages. The target environment object may represent a first stage of the process (and may be referred to herein as the "primary" target environment object); the secondary target environment object may represent a second stage of the process; and so on. For example, for individual environment objects having the deletion type relationship with the secondary target environment objects, the deletion component 112 may be configured to perform one or more of classify them as tertiary target environment objects to be deleted (where identification of tertiary target environment objects may initiate a subsequent stage in the cascade process), identify the environment objects having relationships with the tertiary target environment objects, classify the relationships with the tertiary target environment objects based on the relationship types, and/or other operations. In this example, the tertiary target environment objects may represent a third stage of the process. This process may continue until no additional relationships between target environment objects and other environment objects are able to be identified that would result in either deletion of the objects or nullification of information included in the objects.

In some implementations, another way to look at the policy is to consider individual environment objects as nodes, and the nodes are connected by edges, which represent relationships between environment objects. The policy may dictate a process where, at each node, it is determined if the environment object is a target environment object to be deleted. At each node representing a target environment object, neighboring nodes (e.g., environment objects connected to a target environment object through some relationships) connected by edges may be identified and determined if they are also targeted for deletion or information nullification, based on the relationship types. Thus, a cascading process is created.

Figure 4:
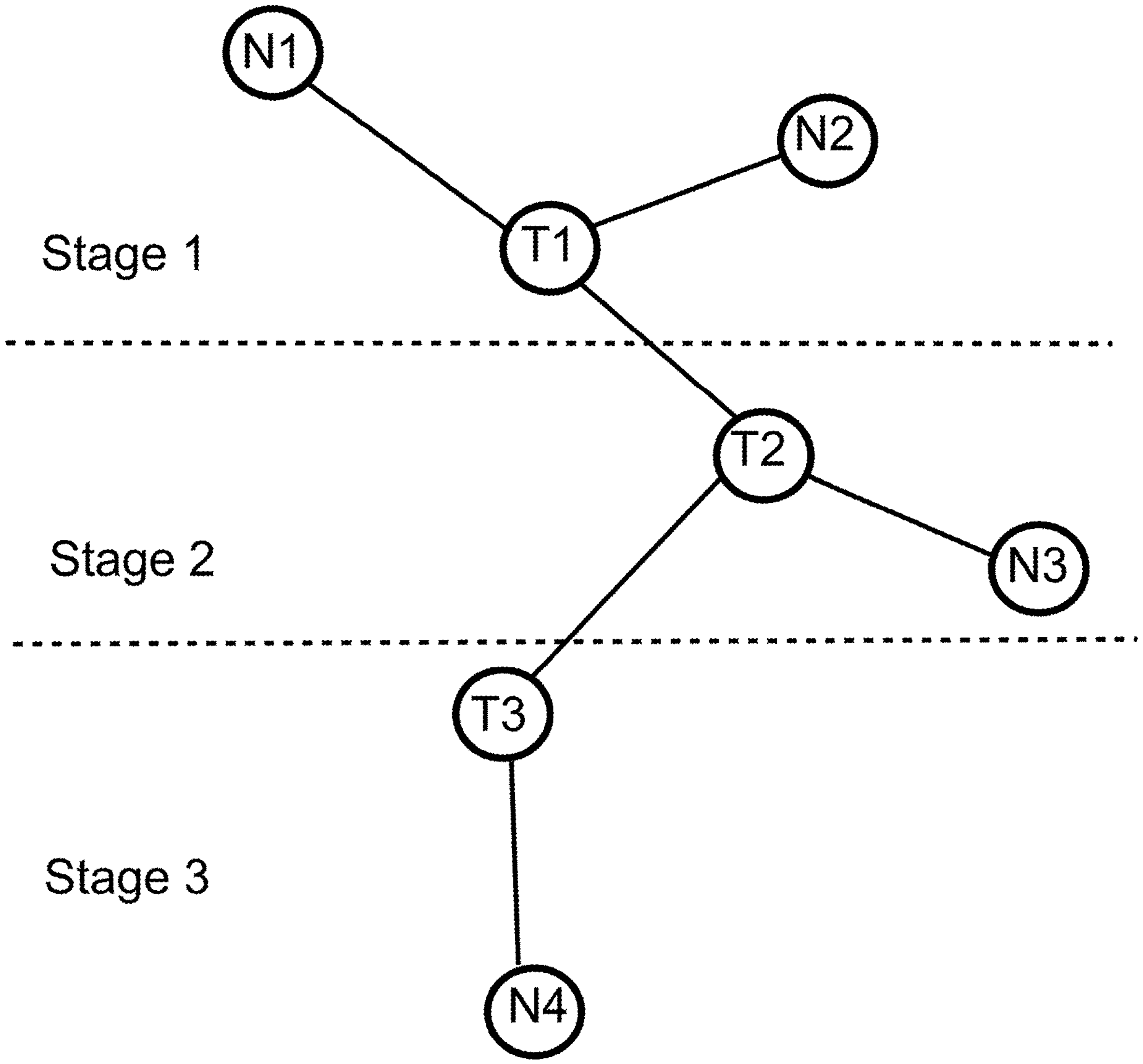
FIG. 4 depicts a cascading process of deletion, in accordance with one or more implementations.

FIG. 4 illustrates a cascading process of deletion, represented by nodes (circles) and edges (lines) between nodes, which depicts stepping down into different stages of environment objects based on their relationship with objects slated for deletion. In the illustration, individual environment objects are nodes, and the edges (lines) between nodes which represent relationships between environment objects. At the first stage ("Stage 1"), a primary target environment object, "T1", may be identified. The nodes neighboring T1 may be identified, and determined if they are also targeted for deletion or information nullification, based on the relationship types. By way of non-limiting illustration, nodes having nullification type relationships with T1 include N1 and N2. A node having a deletion type relationship with T1 is labeled T2. Thus, T2 represents a secondary target environment object, which starts another stage of the process ("Stage 2"). In the second stage, nodes having relationships with the T2 may be identified. By way of non-limiting illustration, a node having the nullification type relationship with T2 includes N3. A node having a deletion type relationship with T2 is labeled T3. Thus, T3 represents a tertiary target environment object, which starts yet another stage of the process ("Stage 3"). In the third stage, nodes having relationships with the T3 may be identified. For illustrative purposes, only one node having the nullification type relationship with T3 may be identified, labeled N4. Thus, the cascading process ends at the identification of N4, since no further relationships with target environment objects are able to be identified that would result in either deletion or nullification. The three stages depicted in FIG. 4 are for illustrative purposes only and are not to be considered limiting. Instead, those skill in the art may appreciate that, in some cases, the process may extend to further stages and end with fewer stages.

Returning to FIG. 1, the deletion component 112 may be configured to obtain requests to delete target environment objects. This stage of deletion may comprise a permanent deletion from electronic storage 128. The requests to delete may be generated automatically based on the deletion policy. By way of non-limiting illustration, the requests to delete may be generated automatically in accordance with a job scheduled (e.g., 30 days and/or other periods of time) following the trashing of the environment objects. In some implementations, the requests to delete may be generated by an administrator and/or other user.

In response to obtaining the request to delete target environment object, deleting component 112 may be configured to delete target environment objects (e.g., primary, secondary, tertiary, etc.) and/or nullify information included in the appropriate environment objects.

The deletion component 112 may be configured to delete, from the non-transitory electronic storage 128, the target environment objects and the environment objects having the deletion type relationship with the target environment objects (e.g., primary, secondary, tertiary, etc.).

The deletion component 112 may be configured to, for individual ones of the environment objects having the nullification type relationship with one or more of the target environment objects (e.g., primary, secondary, tertiary, etc.), nullify the information included in the individual ones of the environment objects that references the target environment objects (e.g., primary, secondary, tertiary, etc.). Nullification may include setting information fields to one or more of "zero," "null," or other value that does not cause the environment object to be invalid.

The user interface component 114 may be configured to effectuate presentation of instances of a user interface of the collaboration environment. The user interface may provide one or more views of the collaboration environment and/or provide other features and/or functionality. The one or more views may include one or more pages of the collaboration environment and/or other views. In some implementations, an individual view of the collaboration environment may textually and/or graphically display information from one or more of a user record, a task record, project record, an objective record, and/or other records. By way of non-limiting illustration, a view may display one or more of a work unit page, a project page, a business objective page, a queue of units of work, and/or other information.

The user interface component 114 may be configured to effectuate presentation of a user interface through which users submit requests to delete (e.g., trash or soft delete) environment objects and/or otherwise interact with the collaboration environment. The user interface may include one or more user interface elements through which users interact with the collaboration environment. User interface elements may include one or more of virtual buttons, drop down menus, check boxes, and/or other user interface elements. By way of non-limiting illustration, a work unit page for a work unit record may include a user interface element that, upon selection of the user interface element, a user-initiated request to delete the work unit record may be generated.

Figure 3:
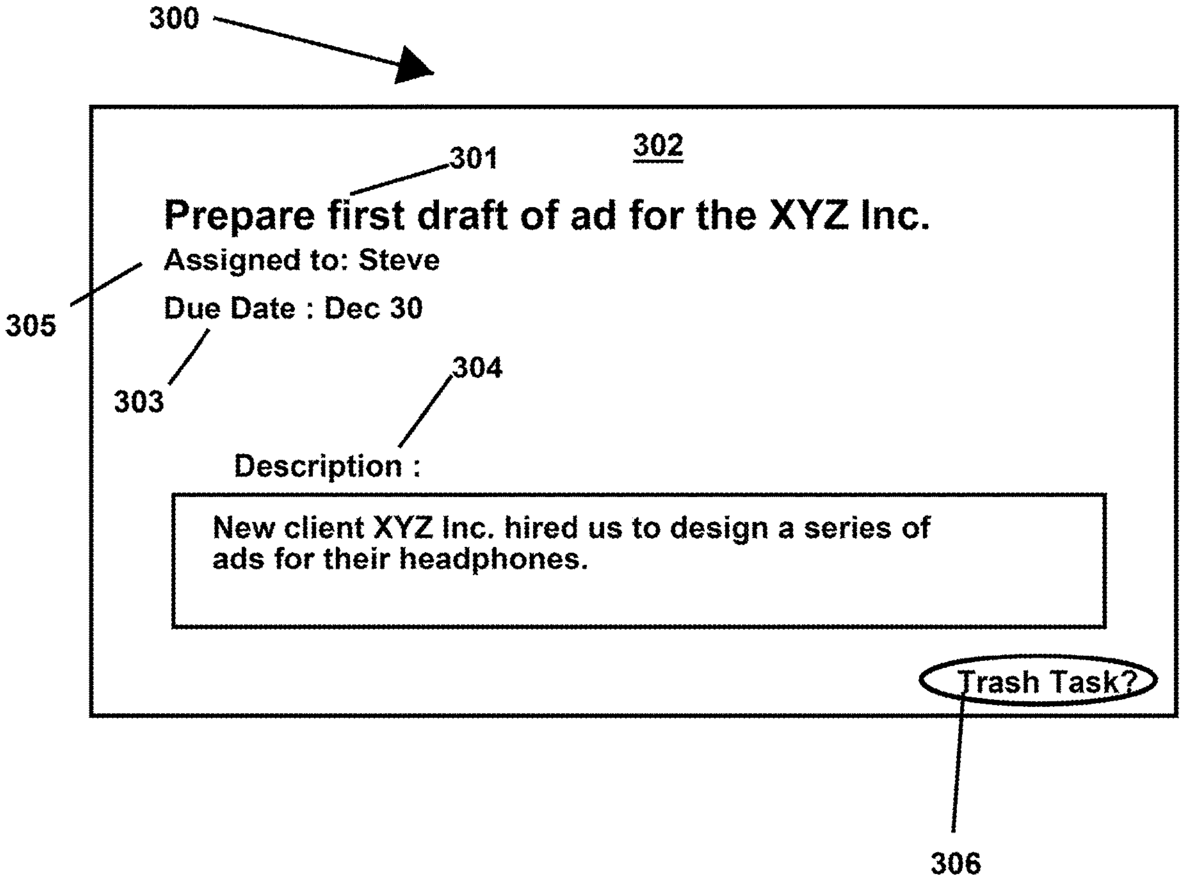
FIG. 3 illustrates a user interface, in accordance with one or more implementations.

FIG. 3 illustrates a user interface 300 of a collaboration environment, in accordance with one or more implementations. The user interface 300 may include a view of a collaboration environment. In particular, the user interface 300 may comprise a work unit page 302 for work unit record of a unit of work. The user interface 300 may display values of one or more work unit parameters, and/or other information. By way of non-limiting illustration, a user interface element 301 may display a title of the unit of work. A user interface element 303 may display a due date of the unit of work. A user interface element 305 may display an assignee of the unit of work. A user interface element 304 may display a description of the unit of work. The work unit page 302 may include a user interface element 306 comprising, for example, a virtual button, corresponding to deleting/trashing the work unit record. Selection of the user interface element 306 may cause a user-initiated request to delete the work unit record to be generated.

Referring back to FIG. 1, in some implementations, server(s) 102, client computing platform(s) 104, and/or external resources 126 may be operatively linked via one or more electronic communication links. For example, such electronic communication links may be established, at least in part, via a network 116 such as the Internet and/or other networks. It will be appreciated that this is not intended to be limiting, and that the scope of this disclosure includes implementations in which server(s) 102, client computing platform(s) 104, and/or external resource(s) 126 may be operatively linked via some other communication media.

A given client computing platform may include one or more processors configured to execute computer program components. The computer program components may be configured to enable an expert or user associated with the given client computing platform to interface with system 100 and/or external resource(s) 126, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resource(s) 126 may include sources of information outside of system 100, external entities participating with system 100, and/or other resources. In some implementations, some or all of the functionality attributed herein to external resource(s) 126 may be provided by resources included in system 100.

Server(s) 102 may include electronic storage 128, one or more processors 130, and/or other components. Server(s) 102 may include communication lines, or ports to enable the exchange of information with a network 116 and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 128 may comprise non-transitory storage media that electronically stores information. The electronic storage media of electronic storage 128 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 128 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 128 may include one or more virtual storage resources (e.g., cloud storage, a virtual private network, and/or other virtual storage resources). Electronic storage 128 may store software algorithms, information determined by processor(s) 130, information received from server(s) 102, information received from client computing platform(s) 104, and/or other information that enables server(s) 102 to function as described herein.

Processor(s) 130 may be configured to provide information processing capabilities in server(s) 102. As such, processor(s) 130 may include one or more of a digital processor, a physical processor, an analog processor, a digital circuit designed to process information, an analog circuit designed to process information, a state machine, and/or other mechanisms for electronically processing information. Although processor(s) 130 is shown in FIG. 1 as a single entity, this is for illustrative purposes only. In some implementations, processor(s) 130 may include a plurality of processing units. These processing units may be physically located within the same device, or processor(s) 130 may represent processing functionality of a plurality of devices operating in coordination. Processor(s) 130 may be configured to execute components 108, 110, 112, 114, and/or other components. Processor(s) 130 may be configured to execute components 108, 110, 112, and/or 114, and/or other components by software; hardware; firmware; some combination of software, hardware, and/or firmware; and/or other mechanisms for configuring processing capabilities on processor(s) 130. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112 and/or 114 are illustrated in FIG. 1 as being implemented within a single processing unit, in implementations in which processor(s) 130 includes multiple processing units, one or more of components 108, 110, 112, and/or 114 may be implemented remotely from the other components. The description of the functionality provided by the different components 108, 110, 112, and/or 114 described below is for illustrative purposes, and is not intended to be limiting, as any of components 108, 110, 112, and/or 114 may provide more or less functionality than is described. For example, one or more of components 108, 110, 112, and/or 114 may be eliminated, and some or all of its functionality may be provided by other ones of components 108, 110, 112, and/or 114. As another example, processor(s) 130 may be configured to execute one or more additional components that may perform some or all of the functionality attributed below to one of components 108, 110, 112, and/or 114.

Figure 2:
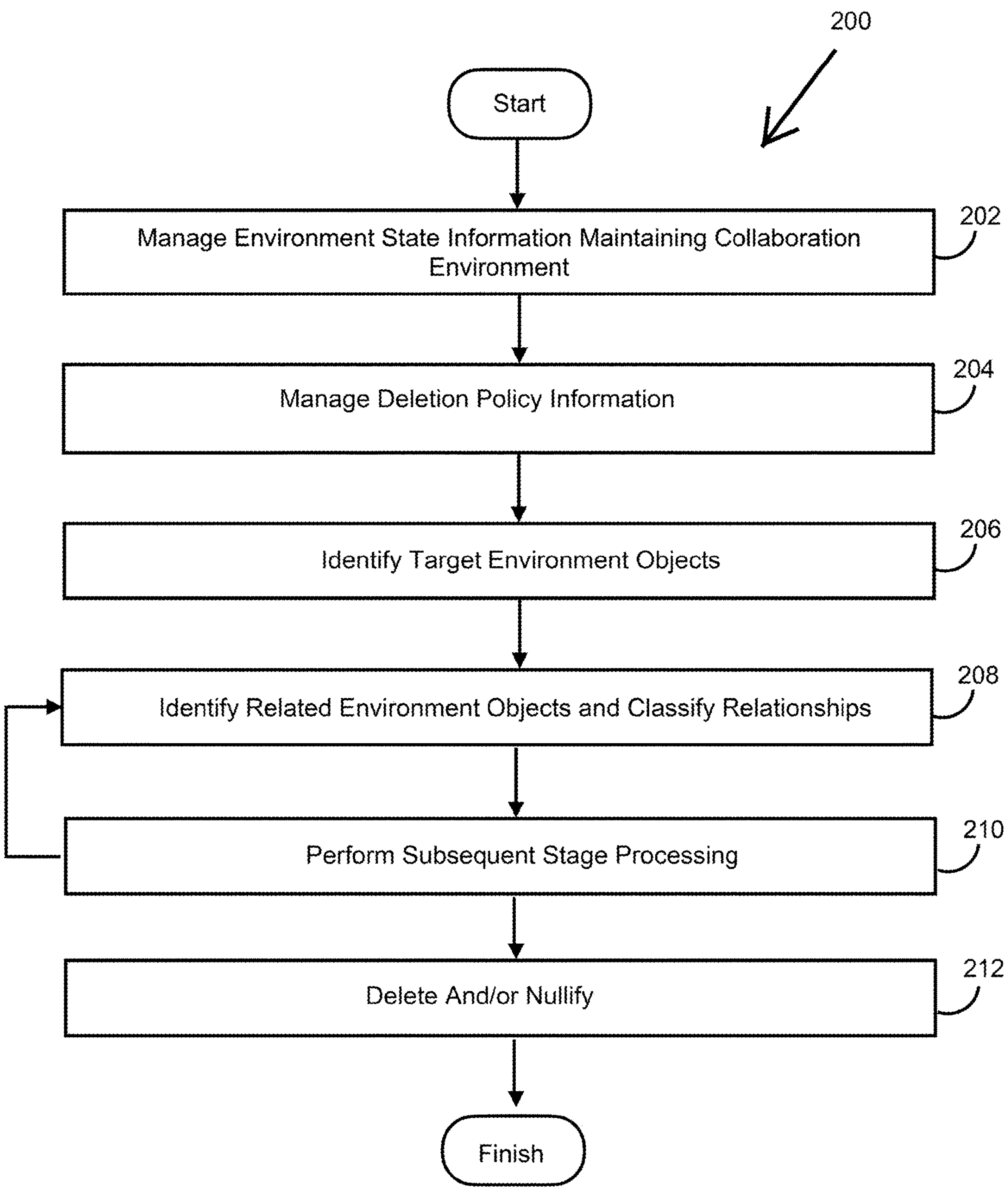
FIG. 2 illustrates a method to implement an information deletion policy for information maintaining a collaboration environment, in accordance with one or more implementations.

FIG. 2 illustrates a method 200 to implement an information deletion policy for information maintaining a collaboration environment, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may manage environment state information maintaining a collaboration environment. The collaboration environment may be configured to facilitate interaction by users with the collaboration environment. The environment state information may include environment objects and/or other information. The environment objects may describe one or more of the users, units of work managed, created, and/or assigned within the collaboration environment, and/or other information. The environment state information may be stored in the non-transitory electronic storage. Operation 202 may be performed by one or more hardware processors configured by machine-readable instructions including a component that is the same as or similar to environment state component 108, in accordance with one or more implementations.

An operation 204 may manage deletion policy information and/or other information. The deletion policy information may define a deletion policy for the environment state information. The deletion policy may indicate a cascading process of deletion of the environment objects based on relationship types with other environment objects slated for deletion. The environment objects slated for deletion may be referred to as "target environment objects." By way of non-limiting illustration, cascading process may dictate deletion of individual ones of the environment objects having a deletion type relationship with an individual target environment object. By way of non-limiting illustration, cascading process may dictate nullification of information included in the individual ones of the environment objects having a nullification type relationship with the individual target environment object. The deletion policy information may be stored in the non-transitory electronic storage. Operation 204 may be performed by one or more hardware processors configured by machine-readable instructions including a component that is the same as or similar to policy component 110, in accordance with one or more implementations.

An operation 206 may identify target environment objects to be deleted. Operation 206 may be performed by one or more hardware processors configured by machine-readable instructions including a component that is the same as or similar to deletion component 112, in accordance with one or more implementations.

An operation 208 may identify the environment objects having relationships with the target environment objects and/or classify the relationships based on the relationship types. This part of the process may be referred to as a first "stage." Operation 208 may be performed by one or more hardware processors configured by machine-readable instructions including a component that is the same as or similar to deletion component 112, in accordance with one or more implementations.

An operation 210 may perform subsequent stage processing until no additional relationships between target environment objects and other environment objects are able to be identified that would result in either deletion of the objects or nullification of information included in the objects. By way of non-limiting illustration, for individual ones of the environment objects having the deletion type relationship with the target environment objects, operation 210 may classify the individual ones of the environment object as secondary target environment objects to be deleted. The identification of the secondary target environment objects may initiate a subsequent stage in the cascade process. In the second stage (which comprises repeating the same or similar operation as operation 208), for the individual ones of the environment object identified as secondary target environment objects to be deleted, operation 210 may identify (via a repeat of operation 208) other environment objects having relationships with the secondary target environment objects. For the individual ones of the other environment objects having relationships with the secondary target environment objects, operation 210 may classify (via a repeat of operation 208) the relationships with the secondary target environment objects based on the relationship types. Operation 210 may be performed by one or more hardware processors configured by machine-readable instructions including a component that is the same as or similar to deletion component 112, in accordance with one or more implementations.

An operation 212 may delete environment objects from the non-transitory electronic storage and/or nullify information based on relation types. Operation 212 may delete, from the non-transitory electronic storage, the target environment objects and the environment objects having the deletion type relationship with the target environment objects (e.g., primary, secondary, tertiary, etc.). Operation 212 may, for individual ones of the environment objects having the nullification type relationship with one or more of the target environment objects (e.g., primary, secondary, tertiary, etc.), nullify the information included in the individual ones of the environment objects that references the target environment objects (e.g., primary, secondary, tertiary, etc.). Operation 212 may be performed by one or more hardware processors configured by machine-readable instructions including a component that is the same as or similar to deletion component 112, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed:

1. A system configured to delete information objects from non-transitory electronic storage based on implementation of an information deletion policy, the system comprising:

non-transitory electronic storage storing:

environment state information maintaining a collaboration environment, the collaboration environment being configured to facilitate interaction by users with the collaboration environment, the environment state information including environment objects describing the users and units of work managed, created, and/or assigned within the collaboration environment; and deletion policy information defining a deletion policy for the environment state information, where the deletion policy dictates a cascading process of deletion of the environment objects based on relationship types with target environment objects to be deleted, wherein the cascading process dictates deletion of individual ones of the environment objects having a deletion type relationship with an individual target environment object, and nullification of information included in the individual ones of the environment objects having a nullification type relationship with the individual target environment object;

one or more physical processors configured by machine-readable instructions to:

identify the target environment objects to be deleted;

identify the environment objects having relationships with the target environment objects, and classify the relationships based on the relationship types;

for individual ones of the environment objects having the deletion type relationship with the target environment objects:

classify them as secondary target environment objects to be deleted;

identify the environment objects having relationships with the secondary target environment objects; and classify the relationships with the secondary target environment objects based on the relationship types;

delete, from the non-transitory electronic storage, the target environment objects and the environment objects having the deletion type relationship with the target environment objects or secondary target environment objects; and for individual ones of the environment objects having the nullification type relationship with the target environment objects or secondary target environment objects, nullify the information included in the individual ones of the environment objects that references the target environment objects or secondary target environment objects, respectively.

2. The system of claim 1, wherein the deletion type relationship between an environment object and an other environment object is based on the environment object being dependent on the other environment object and/or included in a record hierarchy including the other environment object; and the nullification type relationship between the environment object and the other environment object is based on i) the environment object being independent from the other environment object and ii) the environment object including information that references the other environment object.

3. The system of claim 2, wherein the environment object being dependent on the other environment object causes the environment object to have a restriction which limits completion of the environment object unless and/or until one or more actions are performed and/or completed with respect to the other environment object.

4. The system of claim 1, wherein:

the environment objects include a first environment object, a second environment object, a third environment object, and a fourth environment object;

the first environment object is identified as a first target environment object to be deleted;

the second environment object has the deletion type relationship with the first environment object and is classified as a first secondary target environment object;

the third environment object has the nullification type relationship with the first environment object; and the fourth environment object has the deletion type relationship with the second environment object and is identified as a second secondary target environment object.

5. The system of claim 4, wherein the one or more physical processors are further configured by the machine-readable instructions to:

in response to a request to delete the first environment object:

delete the first environment object, the second environment object, and the fourth environment object; and nullify first information included in the third environment object that references the first environment object.

6. The system of claim 1, wherein the environment objects store user records and work unit records, the user records describe the users, and the work unit records describe the units of work managed, created, and/or assigned within the collaboration environment.

7. The system of claim 1, wherein the work unit records include:

task records describing tasks assigned to the users who are expected to accomplish one or more actions to complete the tasks;

project records describing projects managed by the users, individual ones of the project records being associated with individual sets of the task records including the tasks that directly support fulfillment of the individual ones of the projects; and objective records describing objectives managed by the users, individual ones of the objective records being associated other individual sets of the task records including the tasks that indirectly support fulfillment of the individual ones of the objectives.

8. The system of claim 1, wherein the one or more physical processors are further configured by the machine-readable instructions to:

obtain user input information conveying user input into a user interface of the collaboration environment, the user input conveying user-initiated requests to delete one or more of the environment objects;

in response to obtaining the user input information, generate the user-initiated requests to delete the one or more of the environment objects; and in response to generating the user-initiated requests, classify individual ones of the one or more of the environment objects as the target environment objects.

9. The system of claim 8, wherein the one or more physical processors are further configured by the machine-readable instructions to:

in response to obtaining the user input information, remove information from the one or more of the environment objects from views of the collaboration environment, while maintaining storage of the one or more of the environment objects in the non-transitory electronic storage.

10. The system of claim 9, wherein the cascading process of deletion of the one or more of the environment objects from the non-transitory electronic storage is scheduled to be performed after a period of time following the user-initiated requests.

11. A method to delete information objects from non-transitory electronic storage based on implementation of an information deletion policy, the method being implemented in a computer system comprising the non-transitory electronic storage, the method comprising:

storing, in the non-transitory electronic storage:

environment state information maintaining a collaboration environment, the collaboration environment being configured to facilitate interaction by users with the collaboration environment, the environment state information including environment objects describing the users and units of work managed, created, and/or assigned within the collaboration environment; and deletion policy information defining a deletion policy for the environment state information, where the deletion policy dictates a cascading process of deletion of the environment objects based on relationship types with target environment objects to be deleted, wherein the cascading process dictates deletion of individual ones of the environment objects having a deletion type relationship with an individual target environment object, and nullification of information included in the individual ones of the environment objects having a nullification type relationship with the individual target environment object;

identifying the target environment objects to be deleted;

identifying the environment objects having relationships with the target environment objects, and classifying the relationships based on the relationship types;

for individual ones of the environment objects having the deletion type relationship with the target environment objects:

classifying them as secondary target environment objects to be deleted;

identifying the environment objects having relationships with the secondary target environment objects; and classifying the relationships with the secondary target environment objects based on the relationship types;

deleting, from the non-transitory electronic storage, the target environment objects and the environment objects having the deletion type relationship with the target environment objects or secondary target environment objects; and for individual ones of the environment objects having the nullification type relationship with the target environment objects or secondary target environment objects, nullifying the information included in the individual ones of the environment objects that references the target environment objects or secondary target environment objects, respectively.

12. The method of claim 11, wherein the deletion type relationship between an environment object and an other environment object is based on the environment object being dependent on the other environment object and/or included in a record hierarchy including the other environment object; and the nullification type relationship between the environment object and the other environment object is based on i) the environment object being independent from the other environment object and ii) the environment object including information that references the other environment object.

13. The method of claim 12, wherein the environment object being dependent on the other environment object causes the environment object to have a restriction which limits completion of the environment object unless and/or until one or more actions are performed and/or completed with respect to the other environment object.

14. The method of claim 11, wherein:

the environment objects include a first environment object, a second environment object, a third environment object, and a fourth environment object;

the first environment object is identified as a first target environment object to be deleted;

the second environment object has the deletion type relationship with the first environment object and is classified as a first secondary target environment object;

the third environment object has the nullification type relationship with the first environment object; and the fourth environment object has the deletion type relationship with the second environment object and is identified as a second secondary target environment object.

15. The method of claim 14, further comprising:

in response to a request to delete the first environment object:

deleting the first environment object, the second environment object, and the fourth environment object; and nullifying first information included in the third environment object that references the first environment object.

16. The method of claim 11, wherein the environment objects store user records and work unit records, the user records describe the users, and the work unit records describe the units of work managed, created, and/or assigned within the collaboration environment.

17. The method of claim 11, wherein the work unit records include:

task records describing tasks assigned to the users who are expected to accomplish one or more actions to complete the tasks;

project records describing projects managed by the users, individual ones of the project records being associated with individual sets of the task records including the tasks that directly support fulfillment of the individual ones of the projects; and objective records describing objectives managed by the users, individual ones of the objective records being associated other individual sets of the task records including the tasks that indirectly support fulfillment of the individual ones of the objectives.

18. The method of claim 11, further comprising:

obtaining user input information conveying user input into a user interface of the collaboration environment, the user input conveying user-initiated requests to delete one or more of the environment objects;

in response to obtaining the user input information, generating the user-initiated requests to delete the one or more of the environment objects; and in response to generating the user-initiated requests, classifying individual ones of the one or more of the environment objects as the target environment objects.

19. The method of claim 18, further comprising:

in response to obtaining the user input information, removing information from the one or more of the environment objects from views of the collaboration environment, while maintaining storage of the one or more of the environment objects in the non-transitory electronic storage.

20. The method of claim 19, further comprising scheduling the cascading process of deletion of the one or more of the environment objects from the non-transitory electronic storage after a period of time following the user-initiated requests.

* * * * *